United States Patent
Yu et al.

(10) Patent No.: US 11,096,115 B2
(45) Date of Patent: Aug. 17, 2021

(54) BEAMFORMING-BASED TRANSMITTING AND RECEIVING OPERATION METHOD AND DEVICE FOR MILLIMETER-WAVE SYSTEM

(71) Applicant: Samsung Electronics Co., Ltd., Suwon-si (KR)

(72) Inventors: Hyunkyu Yu, Suwon-si (KR); Hyukmin Son, Hanam-si (KR); Taeyoung Kim, Seoul (KR); Namjeong Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 172 days.

(21) Appl. No.: 16/347,035

(22) PCT Filed: Nov. 3, 2017

(86) PCT No.: PCT/KR2017/012388
§ 371 (c)(1),
(2) Date: May 2, 2019

(87) PCT Pub. No.: WO2018/084624
PCT Pub. Date: May 11, 2018

(65) Prior Publication Data
US 2019/0281534 A1    Sep. 12, 2019

(30) Foreign Application Priority Data

Nov. 3, 2016 (KR) .................. 10-2016-0146074
Jan. 9, 2017 (KR) .................. 10-2017-0003049

(51) Int. Cl.
*H04W 48/10* (2009.01)
*H04J 11/00* (2006.01)
*H04B 7/26* (2006.01)

(52) U.S. Cl.
CPC .......... *H04W 48/10* (2013.01); *H04B 7/2662* (2013.01); *H04J 11/0073* (2013.01); *H04J 11/0076* (2013.01); *H04J 11/0079* (2013.01)

(58) Field of Classification Search
CPC ... H04W 48/10; H04B 7/2662; H04B 7/0695; H04B 7/0617; H04J 11/0073;
(Continued)

(56) References Cited

U.S. PATENT DOCUMENTS

2011/0274102 A1    11/2011    Kim et al.
2015/0341908 A1    11/2015    Wang et al.
(Continued)

FOREIGN PATENT DOCUMENTS

EP    2 941 072 A1    11/2015
WO    2010/082775 A2    7/2010
(Continued)

OTHER PUBLICATIONS

Qualcomm Incorporated, 'Multi-beam SYNC design', 3GPP TSG RAN WG1 Meeting #86b; Lisbon, Portugal, Oct. 10-14, 2016; R1-1610159.
(Continued)

*Primary Examiner* — Will W Lin
(74) *Attorney, Agent, or Firm* — Jefferson IP Law, LLP

(57) ABSTRACT

Disclosed are a communication technique for merging, with IoT technology, a 5G communication system for supporting a data transmission rate higher than that of a 4G system, and a system therefor. The disclosure can be applied to intelligent services (for example, smart home, smart building, smart city, smart car or connected car, health care, digital education, retail, security and safety related services, and the like) on the basis of 5G communication technology and IoT related technology. Disclosed are a signal, a channel structure, and an operation method and device for supporting
(Continued)

TDM

FDM initial access for a system expected to remarkably increase M communication capacity, by using beamforming on a wide frequency band in next-generation communication for supporting a millimeter-wave (mmWave) band.

15 Claims, 38 Drawing Sheets

(58) Field of Classification Search
CPC .............. H04J 11/0076; H04J 11/0079; H04L 27/2655; H04L 25/03866; H04L 27/2601
See application file for complete search history.

(56) References Cited

U.S. PATENT DOCUMENTS

| | | | |
|---|---|---|---|
| 2016/0294528 A1* | 10/2016 | Kim | H04L 5/0094 |
| 2016/0295345 A1* | 10/2016 | Oh | H04W 48/12 |
| 2016/0308637 A1* | 10/2016 | Frenne | H04J 11/0069 |
| 2017/0353290 A1* | 12/2017 | Abedini | H04L 27/2636 |
| 2018/0048445 A1* | 2/2018 | Jung | H04W 56/0005 |
| 2018/0176065 A1* | 6/2018 | Deng | H04B 7/088 |
| 2019/0089435 A1* | 3/2019 | Mondal | H04B 7/088 |
| 2020/0296765 A1* | 9/2020 | Kim | H04W 74/0833 |

FOREIGN PATENT DOCUMENTS

| | | |
|---|---|---|
| WO | 2015/080646 A1 | 6/2015 |
| WO | 2016/210302 A1 | 12/2016 |

OTHER PUBLICATIONS

Qualcomm Incorporated, 'Single beam PBCH design considerations', 3GPP TSG-RAN WG1 #86b; Sep. 10-14, 2016; Lisbon, Portugal; R1-1610157.
Fujitsu, 'Discussion on initial access in NR', 3GPP TSG RAN WG1 Meeting #86bis; Oct. 10-14, 2016; Lisbon, Portugal; R1-1608812.
Qualcomm Incorporated, 'Initial Access Consideration for Millimeter Wave Systems', 3GPP TSG RAN WG1; Aug. 22-26, 2016; Gothenburg, Sweden; Meeting #86; R1-166384.
Extended European Search Report dated May 13, 2020, issued in European Application No. 17868253.0.

* cited by examiner

FIG. 1
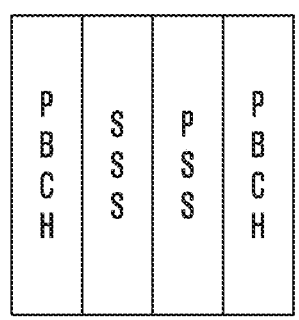
TDM
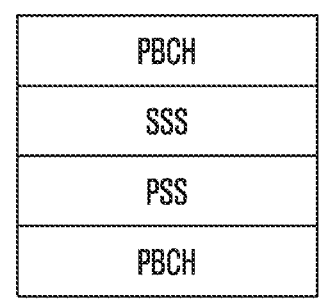
FDM

FIG. 8

| CRC mask for system information indication | PBCH CRC mask |
|---|---|
| 1 | 0,0,0,0 |
| 2 | 1,1,1,1 |
| 3 | 1,0,1,0 |
| 4 | 0,1,0,1 |

FIG. 9

| | PSS | SSS | PBCH |
|---|---|---|---|
| COMBINATION 1 | 2-ANTENNA PORT TRANSMISSION | 2-ANTENNA PORT TRANSMISSION | 2-ANTENNA PORT TRANSMISSION |
| COMBINATION 2 | 1-ANTENNA PORT TRANSMISSION | 2-ANTENNA PORT TRANSMISSION | 2-ANTENNA PORT TRANSMISSION |
| COMBINATION 3 | 1-ANTENNA PORT TRANSMISSION | 1-ANTENNA PORT TRANSMISSION | 2-ANTENNA PORT TRANSMISSION |
| COMBINATION 4 | 2-ANTENNA PORT TRANSMISSION | 1-ANTENNA PORT TRANSMISSION | 2-ANTENNA PORT TRANSMISSION |

FIG. 25

| Beam grouping indication | Grouping |
|---|---|
| 00 | Group 1 : Beam ID 1~100 |
| 01 | Group 1 : Beam ID 1~50<br>Group 2 : Beam ID 51~100 |
| 10 | Group 1 : Beam ID 1~25<br>Group 2 : Beam ID 26~50<br>Group 3 : Beam ID 51~75<br>Group 4 : Beam ID 76~100 |
| 11 | Group 1 : Beam ID 1~12<br>Group 2 : Beam ID 13~25<br>Group 3 : Beam ID 26~37<br>Group 4 : Beam ID 38~50<br>Group 5 : Beam ID 51~62<br>Group 6 : Beam ID 63~75<br>Group 7 : Beam ID 76~87<br>Group 8 : Beam ID 88~100 |

FIG. 32

| Reporting mode | Indication bits |
|---|---|
| Mode 1 | 00 |
| Mode 2 | 01 |
| Mode 1 and 2 | 10 |
| Reserved | 11 |

| Reporting mode | Indication bits |
|---|---|
| Mode 1 | 00 |
| Mode 2 | 01 |
| Mode 3 | 10 |
| Mode 4 | 11 |

FIG. 35

| |
|---|
| $C_{init} = i$ |
| $C_{init} = N_{ID}^{cell} + i$ |
| $C_{init} = N_{ID}^{cell} + (N_{ID}^{cell} \bmod i)$ |
| $C_{init} = N_{ID}^{cell}/2 + i/2$ |
| $C_{init} = (\lfloor i/2 \rfloor + 1) \cdot (2N_{ID}^{cell}+1) \cdot 2^9 + N_{ID}^{cell}$ |
| $C_{init} = 2^{10} \cdot (7 \cdot (\lfloor i/2 \rfloor + 1) + \lfloor i/N_{burst}^{ss\ block} \rfloor + 1) \cdot (2 \cdot N_{ID}^{cell} + 1) + 2 \cdot N_{ID}^{cell} + 1$ |
| $C_{init} = 2^{10} \cdot (7 \cdot (\lfloor i/2 \rfloor + 1) + \lfloor i/N_{burst\ set}^{ss\ block} \rfloor + 1) \cdot (2 \cdot N_{ID}^{cell} + 1) + 2 \cdot N_{ID}^{cell} + 1$ |
| $C_{init} = 2^{10} \cdot (7 \cdot (\lfloor i/2 \rfloor + 1) + \lfloor i/N_{burst\ set}^{ss\ burst} \rfloor + 1) \cdot (2 \cdot N_{ID}^{cell} + 1) + 2 \cdot N_{ID}^{cell} + 1$ |
| $C_{init}$ = INITIAL SEED VALUE FOR GENERATING PBCH SCRAMBLING SEQUENCE<br><br>i = SS block index<br><br>i = OFDM symbol index<br><br>$N_{ID}^{cell}$ = Cell ID<br><br>$N_{burst}^{ss}$ = NUMBER OF SS BLOCKS IN SS BURST |

BEAMFORMING-BASED TRANSMITTING AND RECEIVING OPERATION METHOD AND DEVICE FOR MILLIMETER-WAVE SYSTEM

TECHNICAL FIELD

With the commercialization of 4G communication systems, efforts are being made to develop improved 5G communication systems. The main features of 5G communication systems compared with the 4G communication systems include an increased data rate and low communication latency. The disclosure relates to a signal and channel structure and an operation method and device for supporting initial access in a system that is expected to increase communication throughput dramatically with beamforming within a wide frequency band for next generation communication supporting a millimeter wave (mmWave) band.

BACKGROUND ART

To meet the increased demand for wireless data traffic since the deployment of 4G communication systems, efforts have been made to develop an improved 5G or pre-5G communication system. Therefore, the 5G or pre-5G communication system is also called a "Beyond 4G Network" or a "Post LTE System". Implementation of the 5G communication system in higher frequency (mmWave) bands, e.g., 60 GHz bands, is being considered in order to accomplish higher data rates. To decrease propagation loss of radio waves and increase the transmission distance, beamforming, massive multiple-input multiple-output (MIMO), Full Dimensional MIMO (FD-MIMO), array antenna, analog beam forming, and large scale antenna techniques are being discussed for the 5G communication system. In addition, in the 5G communication system, there are developments under way for system network improvement based on advanced small cells, cloud Radio Access Networks (RANs), ultra-dense networks, device-to-device (D2D) communication, wireless backhaul, moving network, cooperative communication, Coordinated Multi-Points (COMP), reception-end interference cancellation, and the like. In the 5G system, Hybrid FSK and QAM Modulation (FQAM) and sliding window superposition coding (SWSC) as advanced coding modulation (ACM) and filter bank multi carrier (FBMC), non-orthogonal multiple access (NOMA), and sparse code multiple access (SCMA) as advanced access technology have been developed.

The Internet, which is a human centered connectivity network where humans generate and consume information, is now evolving into the Internet of Things (IoT) where distributed entities, such as things, exchange and process information without human intervention. The Internet of Everything (IoE), which is a combination of IoT technology and Big Data processing technology through connection with a cloud server, has emerged. As technology elements, such as "sensing technology", "wired/wireless communication and network infrastructure", "service interface technology", and "security technology" have been demanded for IoT implementation, recently there has been research into a sensor network, Machine-to-Machine (M2M) communication, Machine Type Communication (MTC), and so forth. Such an IoT environment may provide intelligent Internet technology services that create new values for human life by collecting and analyzing data generated among connected things. The IoT may be applied to a variety of fields including smart home, smart building, smart city, smart car or connected car, smart grid, health care, smart appliances, and advanced medical services through convergence and combination between existing Information Technology (IT) and various industrial applications.

In line with these developments, various attempts have been made to apply the 5G communication system to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be an example of convergence between the 5G technology and the IoT technology.

Meanwhile, in legacy technologies, a base station/terminal performs beamforming in a digital domain without consideration of beamforming in an analog domain. Analog beamforming is more easily applicable to communication systems operating in a high frequency band with relatively few physical restrictions, and 5G communication systems are considered to be designed to operate in an ultra-high frequency (mmWave) band (e.g., 30 GHz and 60 GHz) in which it is easy to secure a broad bandwidth for achieving a high data rate. In order to overcome the problems arising from the use of an ultra-high frequency band such as pathloss increase and propagation distance reduction, discussions are underway about using an analog beamforming technique.

DISCLOSURE OF INVENTION

Technical Problem

Although there is a need of a method for transmitting synchronization information and system information for use by a base station/terminal in performing beamforming in the analog domain, no such method has been disclosed yet. In the legacy LTE system, symbol synchronization and sub-frame synchronization (symbol number in a subframe) are achieved using PSS and SSS. In the case of adopting this to the mmWave system, the PSS and SSS should be transmitted in all directions using analog beams in order for all users located within cell coverage to receive them. The PSS and SSS are signals being transmitted repeatedly. Accordingly, the corresponding signals make it possible to achieve symbol synchronization but impossible to achieve subframe synchronization. Thus, there is a need to design appropriate signals and operations for an initial access procedure to achieve subframe synchronization. In the legacy LTE system, PSS detection is performed in the time domain without any channel information. The detected PSS makes it possible to estimate a channel of SSS being transmitted in the same band as the PSS and perform coherent SSS detection based thereon. A PBCH carrying the system information may be detected through coherent decoding on the estimated channel based on CRS. Meanwhile, in the case of using the CRS in the mmWave system, the CRS should be continuously transmitted in all beam directions, and channel estimation based on such CRS increases resource overhead.

The disclosure aims to provide a method for designing a PSS/SSS/PBCH transmission format and transmission schemes for the respective signals in the corresponding format without unnecessary channel estimation and resource overhead.

The disclosure also aims to provide a beam reporting-based beam management method and device of a base station/terminal that is capable of accomplishing a high data rate.

Solution to Problem

According to an embodiment of the disclosure, an initial access method of a terminal in a wireless communication system includes detecting a first synchronization signal and a second synchronization signal, acquiring a cell ID based on the first and second synchronization signals, and receiving system information including an index of a synchronization signal (SS) block on a physical broadcast channel (PBCH).

Preferably, the index of the SS block is distinguished with a scrambling sequence related to the PBCH.

Preferably, the initial access method of the terminal further includes descrambling on the PBCH using the cell ID and part of the index of the SS block, decoding the PBCH based on a result of the descrambling, and acquiring the system information according to a result of the decoding.

Preferably, the SS block comprises the first and second synchronization signals and the PBCH and uses a beam different from that in use by another SS block.

According to another embodiment of the disclosure, an initial access control method of a base station in a wireless communication system includes transmitting a first synchronization signal and a second synchronization signal to a terminal, generating system information including an index of a synchronization signal (SS) block, and transmitting to the terminal the system information including the index of the SS block on a physical broadcast channel (PBCH).

Preferably, the index of the SS block is distinguished with a scrambling sequence related to the PBCH. Preferably, the PBCH is scrambled with a cell ID related to the first and second synchronization signals and part of the index of the SS block.

Preferably, the SS block includes the first and second synchronization signals and the PBCH, and uses a beam different from that in use by another SS block.

According to another embodiment of the disclosure, a terminal performing an initial access in a wireless communication system includes a transceiver configured to transmit and receive signals and a controller connected to the transceiver and configured to control to detect a first synchronization signal and a second synchronization signal, acquire a cell ID based on the first and second synchronization signals, and receive system information including an index of a synchronization signal (SS) block on a physical broadcast channel (PBCH).

According to another embodiment of the disclosure, a base station controlling an initial access in a wireless communication system includes a transceiver configured to transmit and receive signals and a controller connected to the transceiver and configured to control to transmit a first synchronization signal and a second synchronization signal to a terminal, generate system information including an index of a synchronization signal (SS) block, and transmit to the terminal the system information including the index of the SS block on a physical broadcast channel (PBCH).

Advantageous Effects of Invention

The method for designing analog beam-based synchronization signals and signals carrying system information and operating a base station and a terminal accomplishing a high data rate as one of requirements for 5G communication systems according to an embodiment of the disclosure is advantageous in terms of facilitating initial access in an mmWave band.

The beam management method and device of a beam reporting-based base station/terminal for accomplishing a high data rate as one of requirements for 5G communication systems according to another embodiment of the disclosure is advantageous in terms of facilitating stable data transmission/reception in an mmWave band.

BRIEF DESCRIPTION OF DRAWINGS

FIG. 1 is a diagram illustrating PSS/SSS and PBCH transmission structures according to an embodiment of the disclosure;

FIG. 8 is a diagram illustrating a specific information mapping rule for PBCH CRC making according to an embodiment of the disclosure;

FIG. 9 is a diagram illustrating combinations of PSS, SSS, and BCH transmission schemes;

FIG. 25 is a diagram illustrating an RRC configuration for beam grouping according to an embodiment of the disclosure;

FIG. 32 is a diagram illustrating reporting mode indication tables according to an embodiment of the disclosure;

FIG. 35 is a diagram illustrating equations for configuring PBCH scrambling sequence seed value according to an embodiment of the disclosure;

MODE FOR THE INVENTION

Figure 2:
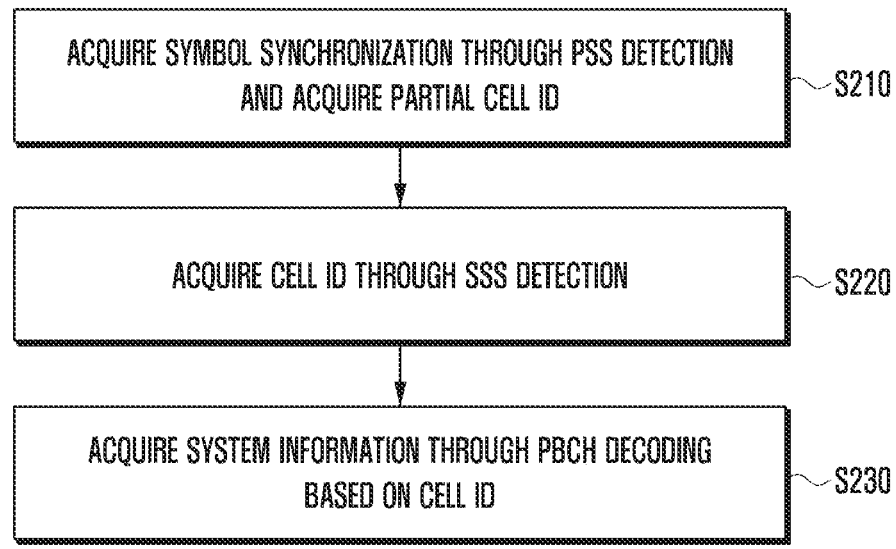
FIG. 2 is a flowchart illustrating a terminal operation procedure for an initial access.

Exemplary embodiments of the disclosure are described in detail with reference to the accompanying drawings. Detailed descriptions of well-known functions and structures incorporated herein may be omitted to avoid obscuring the subject matter of the disclosure. Further, the following terms are defined in consideration of the functionality in the disclosure, and they may vary according to the intention of a user or an operator, usage, etc. Therefore, the definition should be made on the basis of the overall content of the present specification.

Advantages and features of the disclosure and methods of accomplishing the same may be understood more readily by reference to the following detailed descriptions of exemplary embodiments and the accompanying drawings. The disclosure may, however, be embodied in many different forms and should not be construed as being limited to the exemplary embodiments set forth herein; rather, these exemplary embodiments are provided so that this disclosure will be thorough and complete and will fully convey the concept of the disclosure to those skilled in the art, and the disclosure will only be defined by the appended claims. Like reference numerals refer to like elements throughout the specification.

First Embodiment

Before undertaking detailed descriptions of the constructions and operations of the disclosure, a brief description is made of a system to which the disclosure is applied for convenience of explanation. The disclosure discloses a technique that is not limited to current systems and is applicable universally.

A primary synchronization signal (PSS), a secondary synchronization signal (SSS), and a physical broadcast channel (PBCH) are transmitted by a base station on analog beams that are sweeping. It is assumed that the base station transmits the corresponding signals repeatedly on the respective analog beams and a terminal receives the PSS and SSS on a sweeping reception beam to achieve synchronization and the PBCH to acquire the system information in an initial synchronization procedure.

The disclosure encompasses SS and PBCH transmission formats and schemes for initial access and related operation methods and devices of a base station/terminal.

[PBCH Transmission Scheme and Operation Procedure for Synchronization Acquisition]

FIG. 1 is a diagram illustrating PSS/SSS and PBCH transmission structures according to an embodiment of the disclosure.

In reference to FIG. 1, the PSS/SSS and PBCH for an mmWave system may be time-division-multiplexed (TDMed) or frequency-division-multiplexed (FDMed). In TDM, the PSS/SSS and PBCH may be transmitted in such a way of being TDMed using 4 OFDM symbols or multiple sub-symbols obtained by increasing a subcarrier spacing and dividing one OFDM symbol. In FDM, the PSS, SSS, and PBCH may be transmitted in such a way of being FDMed within a predetermined bandwidth (BW). The TDM and FDM are logical mapping schemes.

FIG. 2 is a flowchart illustrating a terminal operation procedure for an initial access.

In the case of transmitting the synchronization signals and PBCH signal as shown in FIG. 1, the terminal operation procedure for the initial access is performed as shown in FIG. 2. The terminal acquires, at step S210, symbol synchronization with a PSS through PSS detection and acquires, at step S220, a cell ID from the PSS and an SSS acquired through the SSS detection. At step 230, the terminal performs PBCH decoding based on the cell ID to acquire system information.

There is a need of a synchronization acquisition process for acquiring subframe synchronization or a symbol number in a subframe in the corresponding procedure. This need may be accomplished through one of three methods as follows.

Method 1: Include symbol index information in the system information transmitted through the PBCH.

Method 2: Transmit the PBCH with a scrambling sequence that makes it possible to identify a symbol index.

Method 3: Transmit the PBCH with CRC masking that makes it possible to identify a symbol index.

In Method 1, the system information being transmitted through the PBCH is designed to vary in every symbol such that a decoding operation is performed without combining the repetitively transmitted PBCHs.

In the TDM structure where the corresponding signals are transmitted over four OFDM symbols, the PBCHs transmitted at two OFDM symbols are independently decoded without being combined. In the TDM structure where the corresponding signals are transmitted over four sub-symbols, the PBCHs transmitted at two sub-symbols may be combined to be decoded.

In a wireless communication system, a terminal may detect a first synchronization signal and a second synchronization signal, on the basis of which a cell ID may be acquired. The terminal may receive system information including an index of a synchronization signal (SS) block on a physical broadcast channel (PBCH). The index of the SS block may be identified by a scrambling sequence associated with the PBCH.

Figure 3:
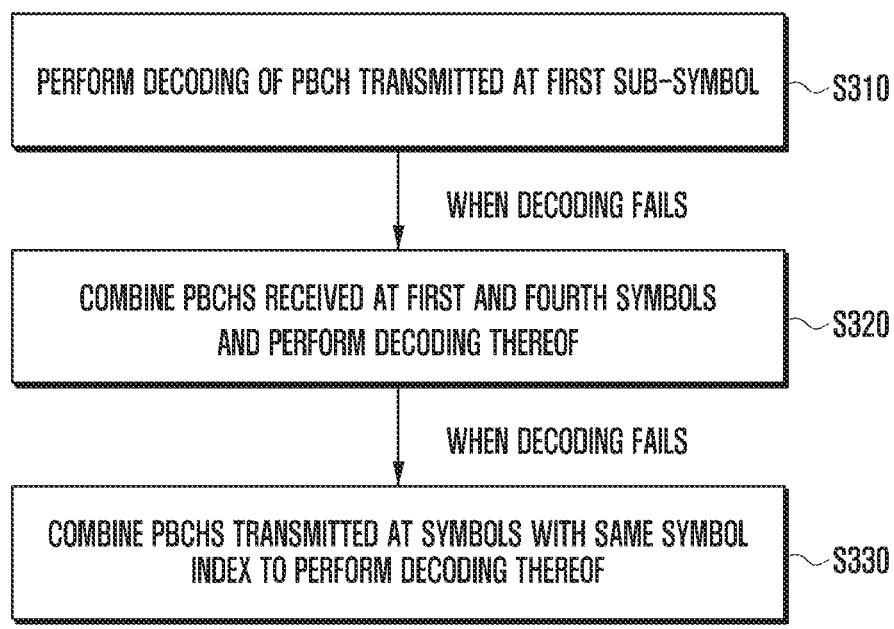
FIG. 3 is a flowchart illustrating a terminal operation procedure in a sub-symbol-based PBCH TDM transmission structure according to an embodiment of the disclosure.

The terminal may perform descrambling on the PBCH using the cell ID and part of the SS block index and decode the PBCH based on the descrambling result. The terminal may acquire the system information according to the decoding result. FIG. 3 is a flowchart illustrating a terminal operation procedure in a sub-symbol-based PBCH TDM transmission structure.

In reference to FIG. 3, a terminal attempts, at step S310, to decode a PBCH transmitted at a first sub-symbol; and, if the terminal fails to decode the PBCH at step S310, it combines the PBCHs received at the first and fourth sub-symbols to decode the PBCH at step S320. If the terminal fails to decode the PBCH at step S320, it combines the PBCHs being transmitted at the same symbol index to decode the PBCH at step S330.

Figure 4:
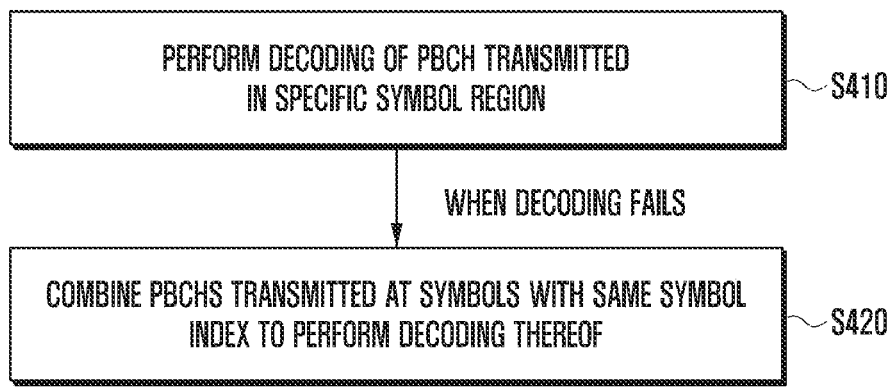
FIG. 4 is a flowchart illustrating a terminal operation procedure in a sub-symbol-based PBCH FDM transmission structure according to an embodiment of the disclosure.

FIG. 4 is a flowchart illustrating a terminal operation procedure in a sub-symbol-based PBCH FDM transmission structure according to an embodiment of the disclosure.

In reference to FIG. 4, the terminal attempts, at step S410, to decode a PBCH transmitted at an OFDM symbol (or predetermined symbol region) and, if the terminal fails to decode the PBCH, it may combine the PBCHs being transmitted at the same symbol index to decode the PBCH at step S420.

In Method 2, an OFDM symbol index is indicated using a cell-specific scrambling sequence. The PBCHs being transmitted at different OFDM symbols are scrambled with different sequences as shown in FIG. 5 under the assumption that the TDM and FDM modes are transmitted through one OFDM symbol as shown in FIG. 1 for convenience of explanation.

Figure 5:
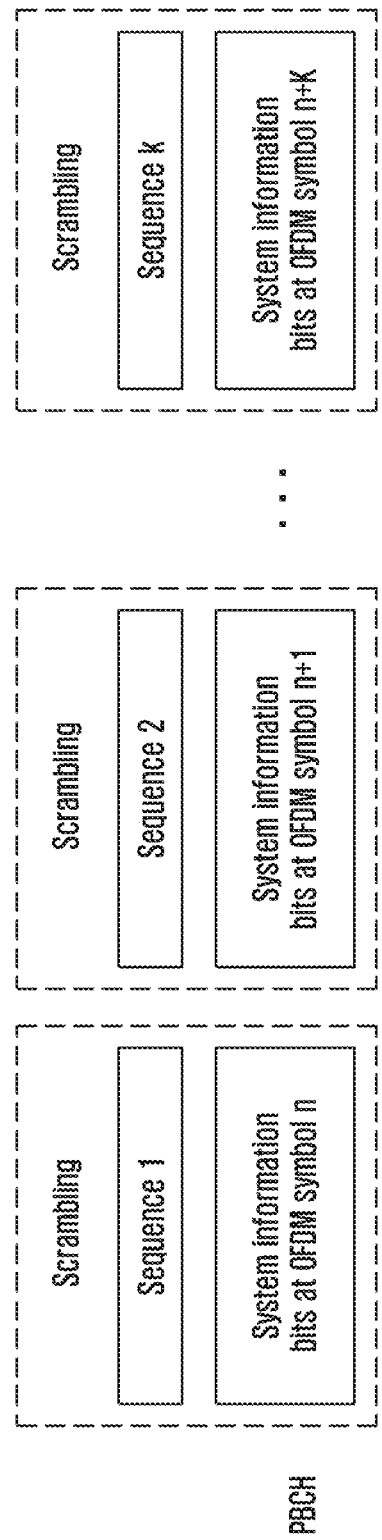
FIG. 5 is a diagram for explaining PBCH scrambling for subframe synchronization acquisition according to an embodiment of the disclosure.

FIG. 5 is a diagram for explaining PBCH scrambling for subframe synchronization acquisition according to an embodiment of the disclosure.

In FIG. 5, the same system information being transmitted through the PBCH is scrambled with different sequences in every OFDM symbol. In the case of transmitting a subframe composed of k OFDM symbols, k different sequences are used; the k scrambling sequences may be generated independently or by dividing a long sequence. The scrambling may be performed at a bit level or a symbol level. In the case where the PBCH is transmitted as shown in FIG. 5, the terminal operates as shown in FIG. 6.

Figure 6:
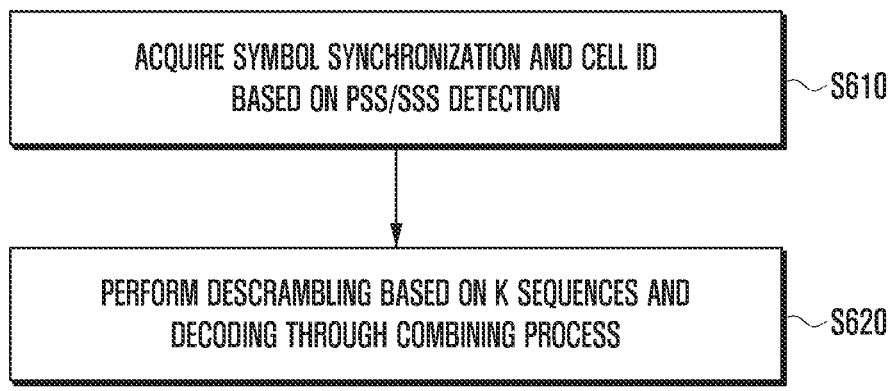
FIG. 6 is a flowchart illustrating a subframe synchronization acquisition operation of a terminal according to an embodiment of the disclosure.

FIG. 6 is a flowchart illustrating a subframe synchronization acquisition operation of a terminal according to an embodiment of the disclosure.

In reference to FIG. 6, the terminal may acquire symbol synchronization and Cell ID based on PSS/SSS detection at step S610. At step S620, the terminal may perform decoding through a descrambling and combining process based on K sequences.

In Method 3, it may be possible to use a scheme of generating a CRC by inserting information indicating specific information during a CRC bit generation process or a scheme of indicating the information by masking generated CRC bits when transmitting a PBCH.

The information that may be indicated by the CRC includes any of system information that should be transmitted through the PBCH as well as the symbol index information. In an embodiment, the information may include information for use in a random access, paging-related channel information, channel information for additional system information transmission, reference signal transmission information related to a beam on which a terminal has to perform measurement after a PBCH, and the number of base station antenna ports. In the case where the symbol index is indicated by CRC, different PBCH bit information is transmitted per symbol, which means that combining is impossible within a subframe.

Figure 7:
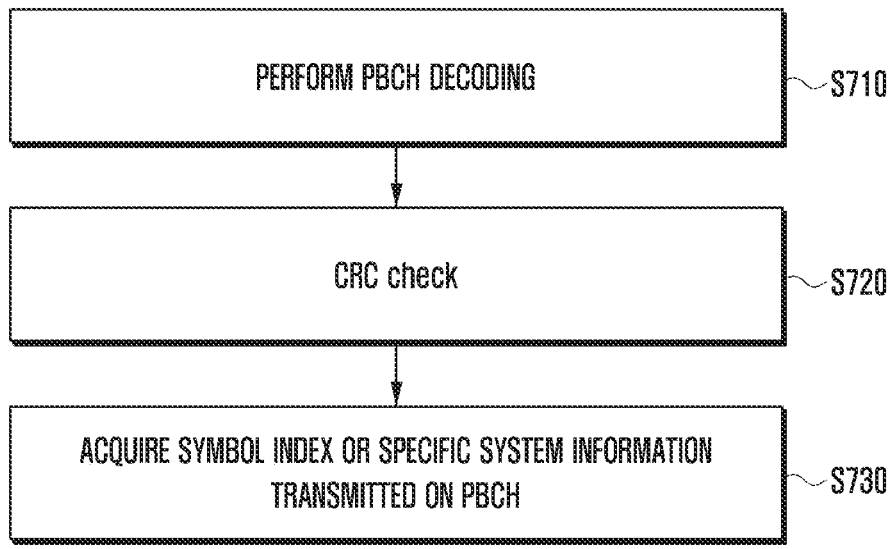
FIG. 7 is a flowchart illustrating a PBCH CRC-based system information acquisition operation of a terminal according to an embodiment of the disclosure.

FIG. 7 is a flowchart illustrating a PBCH CRC-based system information acquisition operation of a terminal according to an embodiment of the disclosure. FIG. 7 shows a procedure for acquiring information indicated by a CRC.

The terminal performs a PBCH decoding at step S710 and a CRC test at step S720. At step S730, the terminal may acquire a symbol index or specific system information that is transmitted through the PBCH.

FIG. 8 is a diagram illustrating a specific information mapping rule for a PBCH CRC making according to an embodiment of the disclosure.

Assuming a 16-bit CRC in FIG. 8, the system information may be transmitted with up to 4 bits. In the case where a subframe consists of 14 symbols, it may also be possible to transmit a symbol index.

As shown in FIG. 8, it may also be possible to perform masking after generating the CRC by mapping orthogonal code-based system information. FIG. 8 exemplifies a 2-bit information indication using 4 CRC bits. That is, four different settings may be used for indicating system information.

[SSS Channel Estimation and PSS Transmission Scheme and Operation Procedure]

FIG. 9 is a diagram illustrating combinations of PSS, SSS, and BCH transmission schemes. Under the assumption that a PBCH is transmitted on two antenna ports, the PSS and SSS may be transmitted using four different methods as shown in FIG. 9.

In Method 1, all signals are transmitted on two ports. In this case, PSS-based SSS channel estimation is possible, and SSS-based PBCH channel estimation is possible.

In Method 2, the PSS is transmitted on one antenna port, which makes it impossible to estimate an SSS channel and thus impossible to perform SSS coherent detection. However, an SSS-based PBCH estimation is possible.

In Method 3, an SSS coherent estimation is possible based on the PSS channel estimation, and an SSS-based PBCH channel estimation is impossible because the SSS is transmitted on one antenna port.

In Method 4, it is exemplified to make it possible to perform PSS-based PBCH channel estimation. Because the SSS or PBCH is transmitted in the frequency domain, 2-port diversity, e.g., SFBC transmission, is supported. However, if the PSS is transmitted based on a ZC sequence as in LTE, the 2-port diversity, e.g., SFBC transmission, is impossible.

The 2-antenna port transmission of the PSS may be performed in such a way of transmitting different PSS sequences on the two different antenna ports. In the case of using a ZC sequence, it may be possible to transmit cyclic-shifted ZC sequences on the two antenna ports or two ZC sequences with different root indices. After detecting two different sequences, the terminal may estimate per-port channels. When the SSS or PBCH is transmitted on two antenna ports, the SSS detection and PBCH detection are possible based on the estimated channel values.

Figure 10:
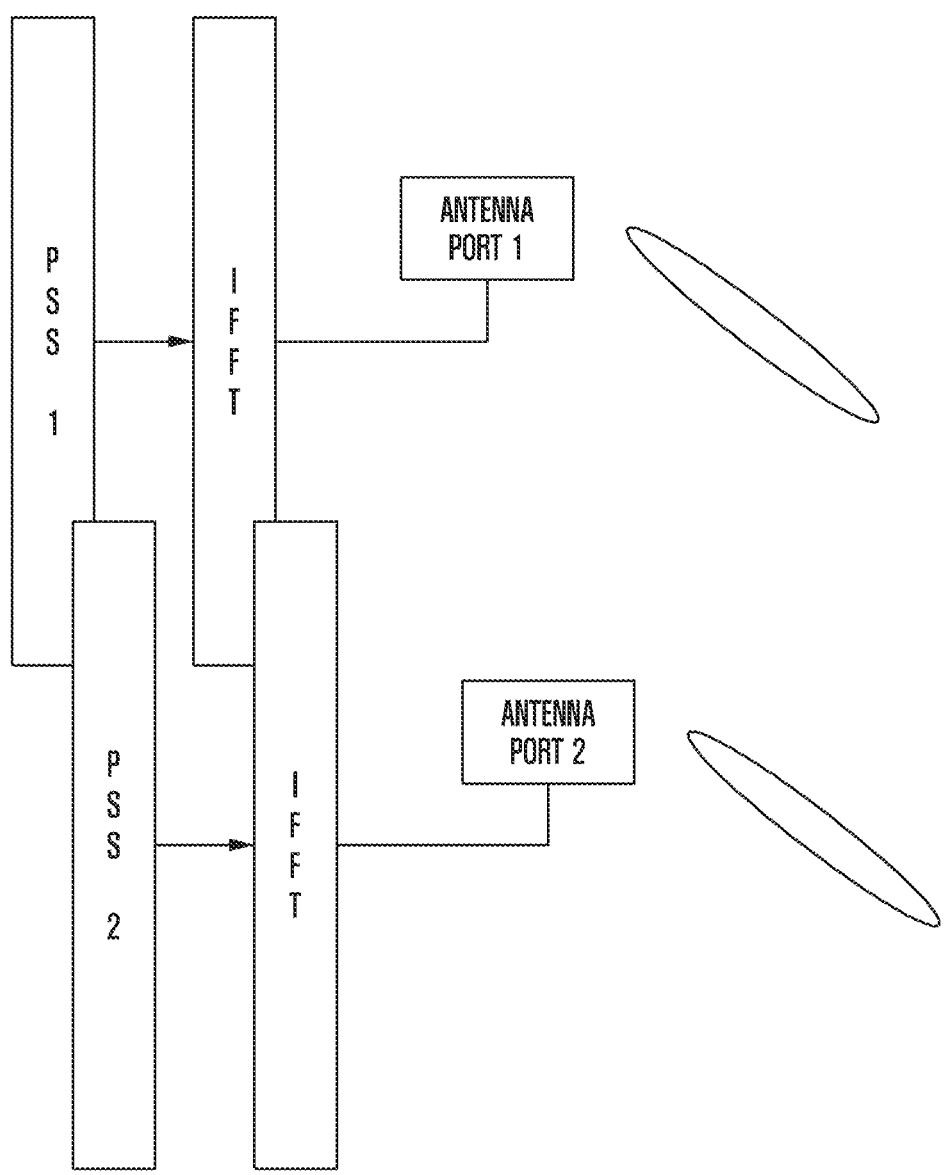
FIG. 10 is a diagram illustrating an example of transmitting different SSS sequences on two antenna ports with the same resources according to an embodiment of the disclosure.

FIG. 10 is a diagram illustrating an example of transmitting different SSS sequences on two antenna ports with the same resources.

FIG. 10 exemplifies transmitting different PSS sequences on different antenna ports in an OFDM-based transmission system.

Figure 11:
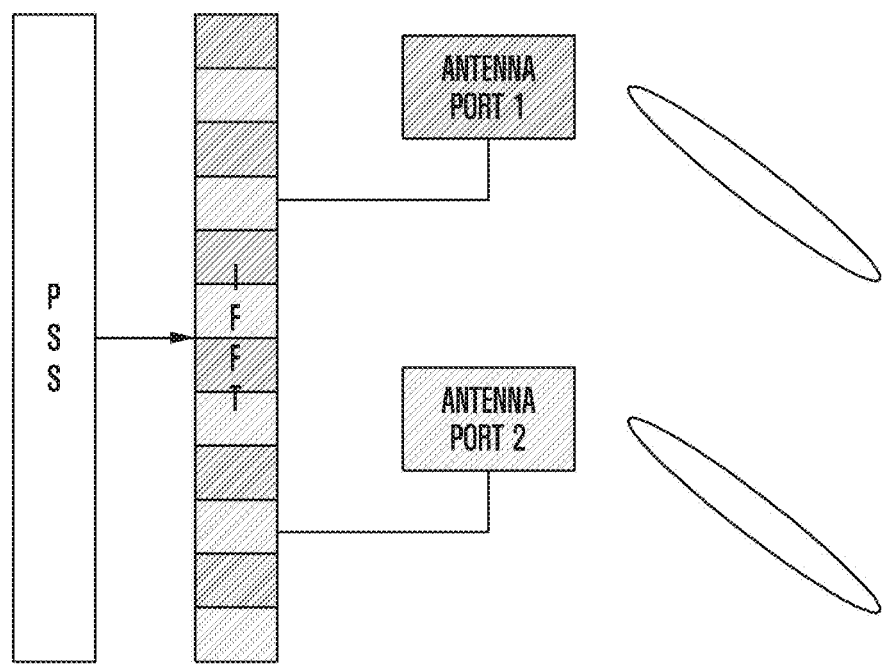
FIG. 11 is a diagram illustrating an example of transmitting the same PSS sequence on orthogonal resources allocated per antenna port according to an embodiment of the disclosure.

FIG. 11 is a diagram illustrating an example of transmitting the same PSS sequence on orthogonal resources allocated per antenna port. In the embodiment of FIG. 11, per-antenna port orthogonal resources are allocated for transmitting a PSS sequence such that channel estimation is performed on the resources that are identified by the respective antenna ports. For example, it may be possible to map an odd-numbered subcarrier and an even-numbered subcarrier to the respective antenna ports and transmit a PSS sequence on the antenna ports.

Figure 12:
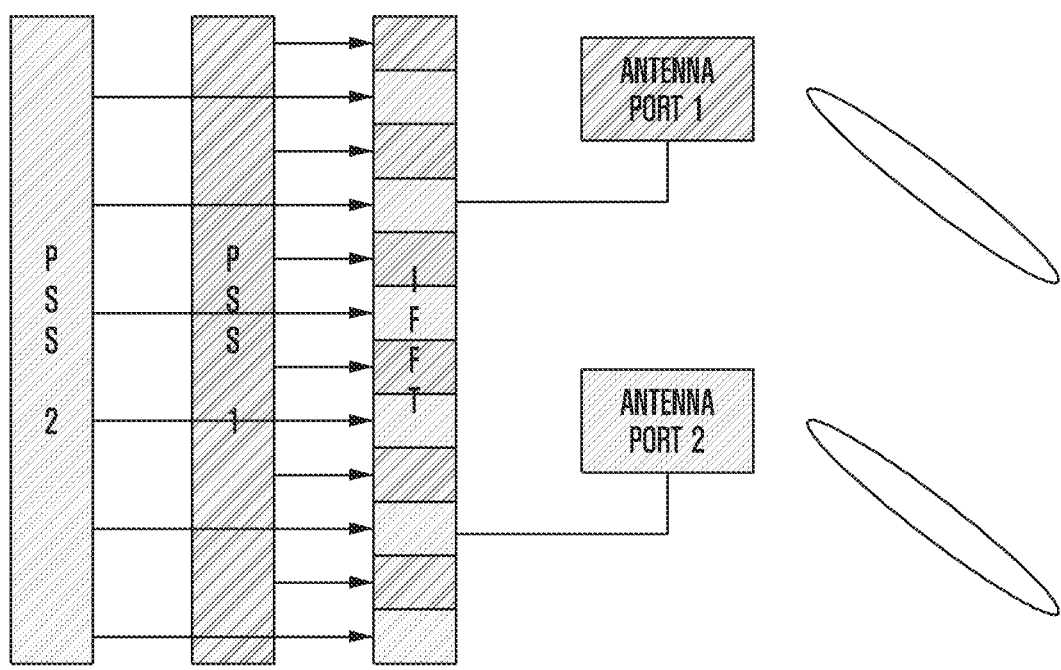
FIG. 12 is a diagram illustrating an example of allocating per-antenna port orthogonal resources and transmitting per-antenna port PSS sequences according to an embodiment of the disclosure.

FIG. 12 is a diagram illustrating an example of allocating per-antenna port orthogonal resources and transmitting per-antenna port PSS sequences. In the embodiment of FIG. 12, different PSSs are transmitted on an antenna port mapped to an odd-numbered subcarrier antenna port and an antenna port mapped to an even-numbered subcarrier. In the embodiment of FIG. 12, it may be possible to estimate channels corresponding to two antenna ports based on the different PSSs transmitted on different resources and different antenna ports.

Figure 13:
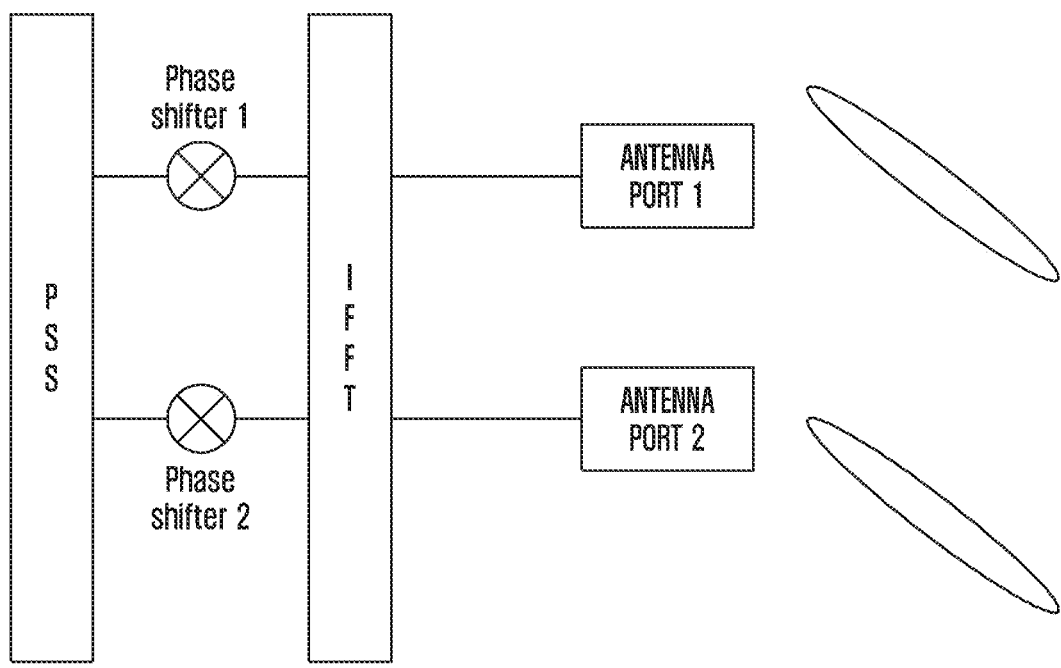
FIG. 13 is a diagram illustrating an example of transmitting a PSS sequence passed through per-antenna port phase shifters on the same resources according to an embodiment of the disclosure.

FIG. 13 is a diagram illustrating an example of transmitting a PSS sequence passed through per-antenna port phase shifters on the same resources. In the embodiment of FIG. 13, the same PSS sequence is transmitted on different antenna ports mapped to the same resources, a receiver distinguishing between the antenna port-specific PSS sequences based on the per-antenna port phase shifters. For example, if phase shifting is performed by only phase shifter 2 and not by phase shifter 1 in the frequency domain, it is possible to distinguish between the two ports based on a delay of a signal corresponding to antenna port 2, i.e., phase shifter.

On the basis of the combinations shown in FIG. 9, a channel estimation and PBCH decoding operation of a terminal is performed as follows.

Figure 14:
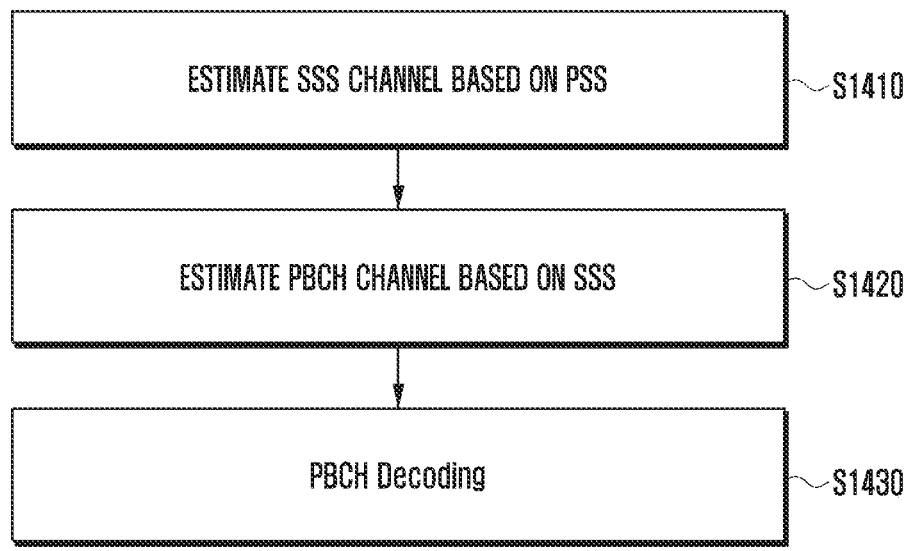
FIG. 14 is a flowchart illustrating a channel estimation operation of a terminal based on a PSS and an SSS according to an embodiment of the disclosure.

FIG. 14 is a flowchart illustrating a channel estimation operation of a terminal based on a PSS and an SSS according to an embodiment of the disclosure. In the embodiment of FIG. 14, an SSS channel is estimated based on a PSS and a PBCH is estimated based on the SSS in the case of Combination 1.

Figure 15:
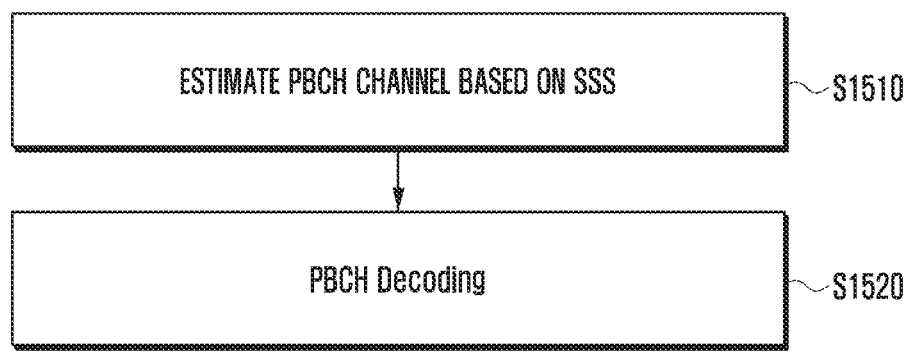
FIG. 15 is a flowchart illustrating an SSS-based channel estimation operation of a terminal according to an embodiment of the disclosure.
Figure 16:
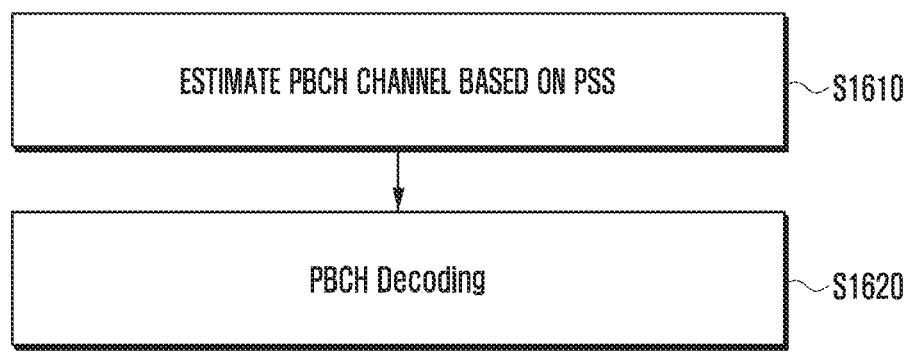
FIG. 16 is a flowchart illustrating a PSS-based channel estimation operation of a terminal according to an embodiment of the disclosure.
Figure 17:
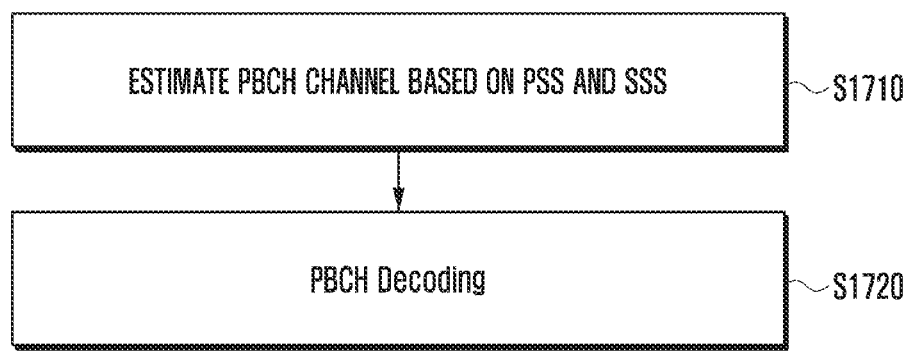
FIG. 17 is a flowchart illustrating a PBCH estimation operation of a terminal based on a PSS and an SSS according to an embodiment of the disclosure.

FIG. 15 is a flowchart illustrating an SSS-based channel estimation operation of a terminal according to an embodiment of the disclosure, FIG. 16 is a flowchart illustrating a PSS-based channel estimation operation of a terminal according to an embodiment of the disclosure, and FIG. 17 is a flowchart illustrating a PBCH estimation operation of a terminal based on a PSS and an SSS according to an embodiment of the disclosure.

In the case of Combination 1, the operation of the embodiment of FIG. 16 is possible because the PSS-based channel estimation result can be immediately used for PBCH decoding. If there is any uncertainty on the PSS-based SSS channel estimation, it may be possible to perform a non-coherent detection on the SSS and SSS-based PBCH estimation for decoding the PBCH as shown in the embodiment of FIG. 15. It may also be possible to perform PBCH channel estimation based on the PSS and SSS as shown in FIG. 17. The disclosed concepts are not limited to the described operation procedures, and they may be extended or combined into another embodiment.

In the case of Combination 2, the operation of the embodiment of FIG. 15 is possible because the PBCH channel should be estimated based on the SSS. In the case of Combination 4, the PBCH may be estimated based on the PSS as shown in FIG. 16.

The above descriptions on the cases of Combinations 1, 2, and 4 are directed to the SS-based PBCH channel estimation and decoding operations of a terminal if there is no RS for PBCH channel estimation according to embodiments of the disclosure.

Figure 18:
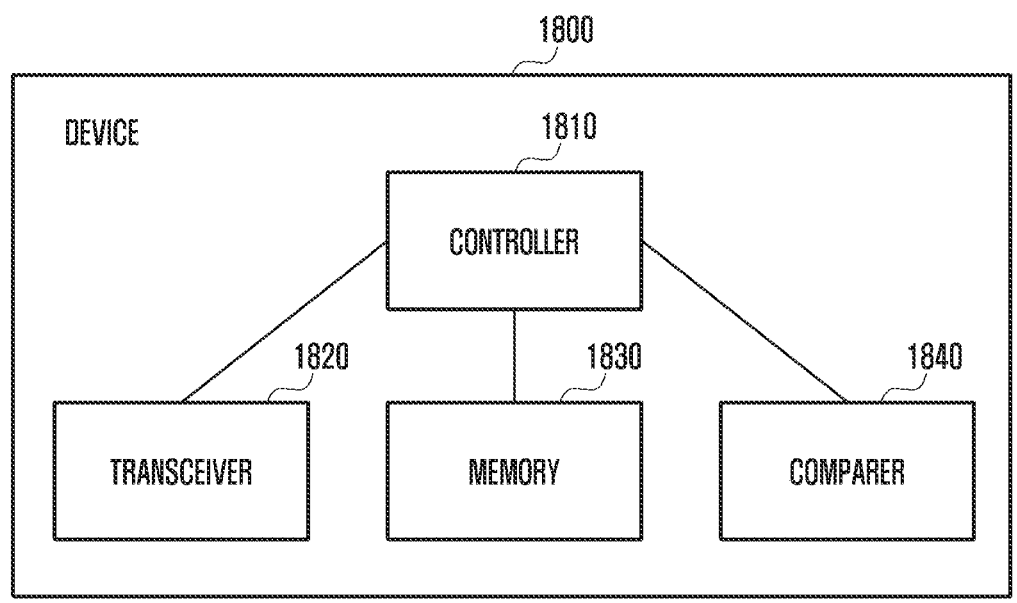
FIG. 18 is a block diagram illustrating a configuration of a terminal according to the first embodiment of the disclosure.

FIG. 18 is a block diagram illustrating a configuration of a terminal according to the first embodiment of the disclosure.

In reference to FIG. 18, the terminal 1800 includes a controller 1810, a transceiver 1820, a memory 1830, and a comparer 1840 by way of example. The components constituting the terminal 1800 may be split into more components or integrated into fewer components depending on an embodiment or an operator's intention.

The memory 1830 stores information signaled by a base station or information buffered in decoding. The memory 1830 stores all of the information saved in the terminal 1800 as described in the above embodiments of the disclosure. The transceiver 1820 receives downlink signals from the base station, as described in the above embodiments, by applying a terminal beamforming under the control of the controller and stores the corresponding results in the memory 1830. The controller 1810 controls overall operations of the terminal as described in the above embodiments. The comparer performs comparison and checking operations executed by a device as described in the above embodiments. Detailed descriptions of individual operations are omitted herein.

Figure 19:
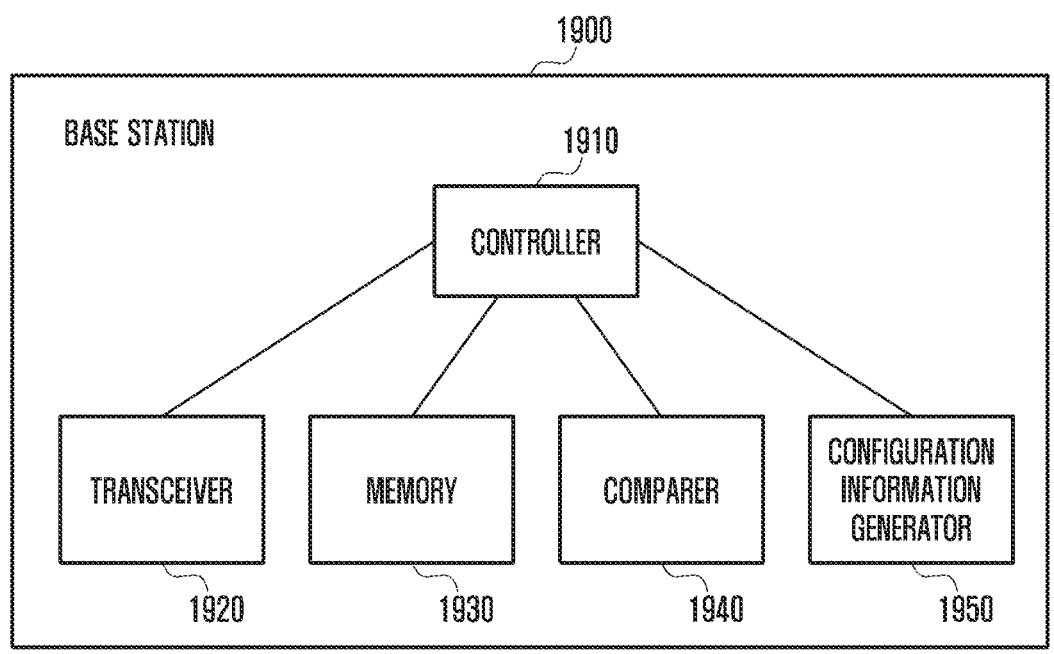
FIG. 19 is a block diagram illustrating a configuration of a base station according to the first embodiment of the disclosure.

FIG. 19 is a block diagram illustrating a configuration of a base station according to the first embodiment of the disclosure.

As shown in FIG. 19, the base station includes a controller 1910, a transceiver 1920, a memory 1930, a comparer 1940, and a configuration information generator 1950 by way of example. The configuration of the base station 1900 is not limited thereto, and the components may be split into more components or integrated into fewer components.

The comparer 1940 performs comparison and checking operations on the information received from a terminal under the control of the controller 1910. The configuration information generator 1950 generates information to be transmitted to terminals under the control of the controller 1910. The memory 1930 stores configuration information transmitted to the terminals. The memory 1930 stores all of the information saved in the base station as described in the above embodiments of the disclosure. The transceiver 1920 transmits downlink signals as described in the above embodiments. Particularly in this embodiment, the transceiver transmits beamforming-based signals. The controller 1910 controls overall operations of the base station as described in the above embodiments.

Although the descriptions are made of the embodiments of FIGS. 18 and 19 by way of examples, the disclosure may include other embodiments of various configurations of the device and receiver. The embodiments of the disclosure may be implemented independently, or two or more embodiments may be combined in part or in whole.

Second Embodiment

In legacy technologies, a base station/terminal performs beamforming in a digital domain without consideration of beamforming in an analog domain. Analog beamforming is more easily applicable to communication systems operating in a high frequency band with relatively few physical restrictions, and 5G communication systems are considered to be designed to operate in an ultra-high frequency (mm-Wave) band (e.g., 30 GHz and 60 GHz) in which it is easy to secure a broad bandwidth for achieving a high data rate. In order to overcome the problems arising from the use of an ultra-high frequency band such as pathloss increase and propagation distance reduction, discussions are underway about using an analog beamforming technique.

After initial access, a terminal has to perform beam measurement continuously to update beam information and transmit the corresponding information to the base station. On the basis of this information, the base station may perform beam management stably to transmit/receive data. However, no such method for supporting beam management has been specified yet in detail.

With the commercialization of 4G communication systems, efforts are being made to develop improved 5G communication systems. The main features of the 5G communication systems compared with the 4G communication systems include an increased data rate and low communication latency.

The disclosure relates to a beam reporting operation and beam management method and device in a system that is expected to increase communication throughput dramatically with beamforming within a wide frequency band for next generation communication supporting a millimeter wave (mmWave) band.

Before undertaking the detailed descriptions of the constructions and operations of the disclosure, a brief description is made of a system to which the disclosure is applied for convenience of explanation. The disclosure discloses a technique that is not limited to current systems and is applicable universally.

Initial access-related synchronization and system information transmission signals and channels are transmitted in a beam sweeping manner with analog beams formed by a base station. It is assumed that the base station transmits the corresponding signals repeatedly on the respective analog beams and a terminal receives a PSS and an SSS on a sweeping reception beam to achieve synchronization and the PBCH to acquire the system information in an initial synchronization procedure. In the initial access procedure, the terminal acquires information on terminal transmission beams and base station reception beams for use in performing random access and performs random access based on the information about a random access resource region associated with the information on the terminal transmission beams and base station reception beams. Hereinafter, the disclosure includes a beam reporting operation method and device for managing beams between the base station and the terminal.

In the case where one or more TRPs exist within a cell, the TRPs may be distinguished from each other as follows.

Scenario 1: When the TRPs are distinguished by orthogonal resources allocated thereto, e.g., 100 beams are managed by a base station within a cell, a frame is structured with the resources allocated for supporting 100 sweeping beams. Accordingly, it may be possible to allocate 100 orthogonal beam resources to the respective TRPs and use 100 beam IDs for identifying the respective TRPs. For example, if two TRPs exist in a cell, beam IDs from 0 to 49 may be used by the first TRP while the beam IDs from 50 to 99 may be used by the second TRP.

Scenario 2: TRPs may be distinguished from each other by generating virtual TRP IDs and mapping the virtual TRP IDs to the TRPs located within a cell.

Basically, the base station transmits a beam-related reference signal (RS) (hereinafter, referred to as BRS for convenience of explanation), and the terminal performs measurement on the BRS. The terminal transmits beam information acquired through the BRS measurement to the base station. The base station performs beam management based on the beam information to maintain stable data transmission/reception.

In order to support the basic operations, the disclosure includes procedures defining information acquired by BRS measurement of the terminal, determining when and how to transmit the corresponding information, and managing beams based on the corresponding information.

The terminal measures beam quality on each beam using the BRS. As in LTE, the corresponding metric is referred to as beam reference signal received power (BRSRP) for convenience of explanation. The UE may acquire BRSRP information on a pair of a base station beam and a terminal beam by performing measurement on a BRS.

If the BRS is transmitted in a TRP-specific manner rather than in a cell-specific manner, the above information may further include a virtual TRP ID.

In an environment where the base station transmits the BRS periodically or aperiodically, the terminal performs measurement on the corresponding BRS, stores a result of the measurement, and reports the measurement result to the base station in response to a reporting command from the base station.

The reporting command of the base station may be in any of following modes.

Mode 1: All beams available in a cell are sorted into N groups, from each of which M beams are selected for transmission; however, M may be set to a different value per group.

Mode 2: M beams are selected per beam of a terminal for transmission.

[Reporting Mode 1 Operation Method and Procedure]

In Mode 1, assuming a beam index range from 1 to 100 within a cell and N=2, beams 1 to 50 are put into one group and beams 51 to 100 into another group, and M beams are selected from each group for transmission. Here, if M is 1 for the first group and 4 for the second group, one of the beams 1 to 50 is selected and a TRP or base station beam ID, a corresponding RSRP, and, if necessary, a virtual TRP ID are reported. In the case of the second group, four beams among the beams 51 to 100 are selected and the beam-related information is transmitted. Here, the beam selection may be performed in a descending order of the RSRP, and the terminal performs the beam selection according to a specific condition transmitted by the base station. The beam selection condition may be configured through RRC signaling or indicated by DCI. In the following description, it is assumed that the beam selection is made in the order of best-RSRP first for convenience of explanation.

In Mode 1, the values N and M are indicated according to an indication method as follows.

In the case of making a reporting indication with N and M, if N=1 and M=1, the terminal selects a beam with the best RSRP among all of the beams. If the terminal has not collected information on all the beams yet, it selects the best beam among the beams on which measurement has already been performed and makes a report thereon. If N=2 and M1 and no information on any of the beams exists at the time when the base station transmits the reporting indication, the terminal makes a report on the corresponding beam group based on the beam information collected until then. If a time window for keeping the measurement beam information is configured, the beam information is discarded upon expiry of the time window.

A beam command-related indication may be made via downlink control information (DCI) with or without defining a process for reporting via RRC and having a basis on the RRC reporting-related configuration information. In the following description, it is assumed that the DCI is transmitted on a PDCCH for convenience of explanation.

Figure 20:
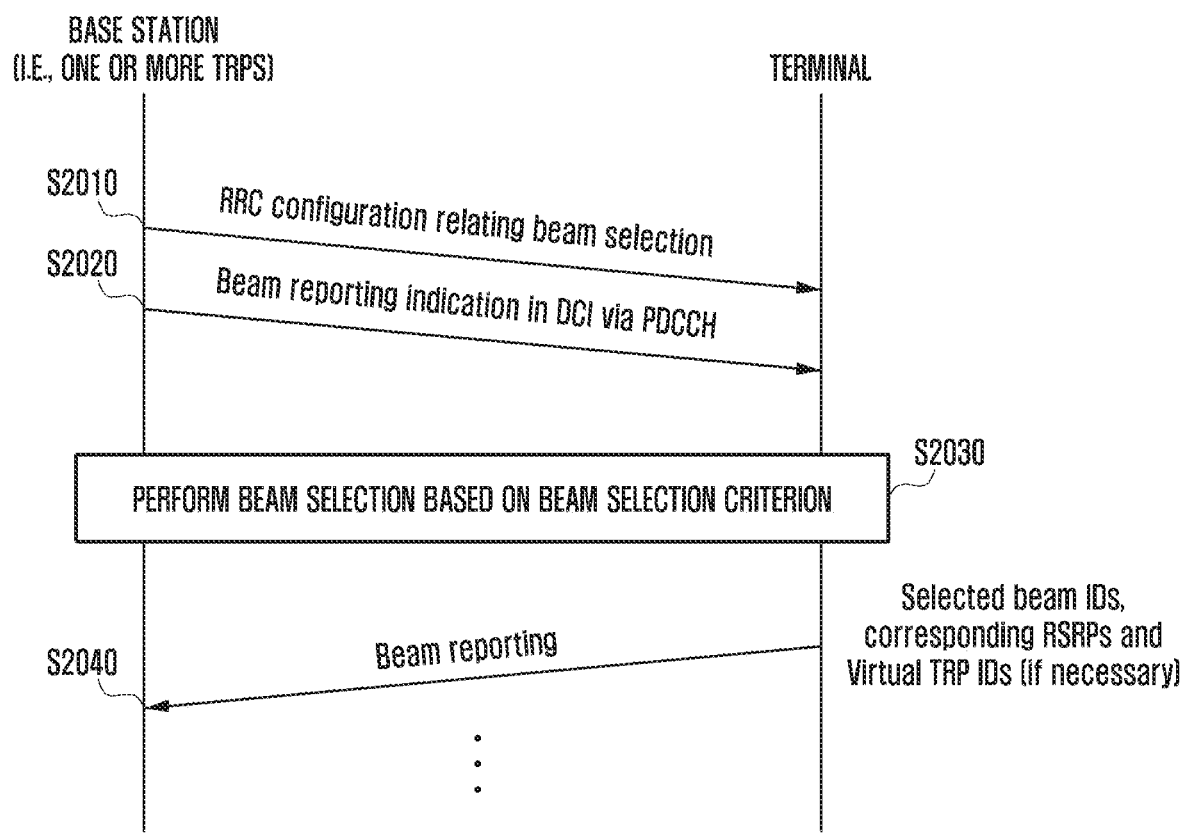
FIG. 20 is a signal flow diagram illustrating a DCI-based beam-reporting operation method and procedure of a base station/terminal according to an embodiment of the disclosure.
Figure 21:
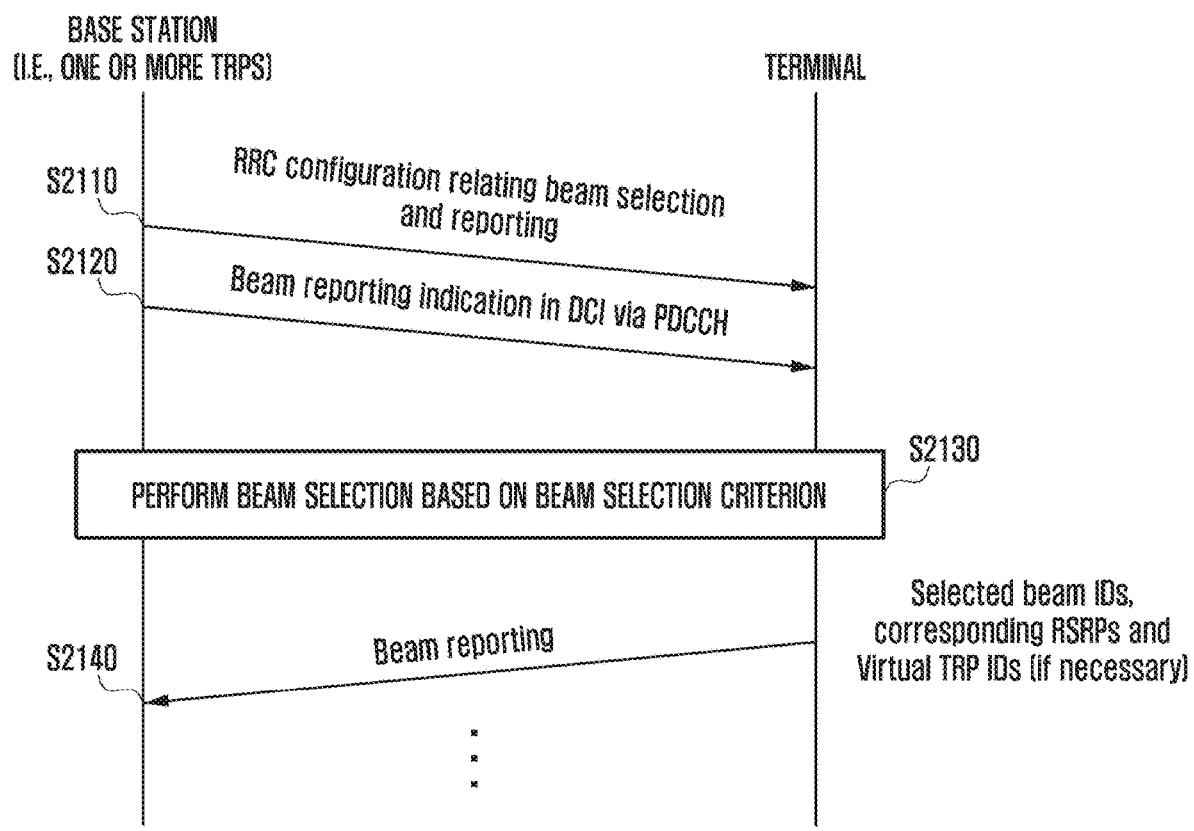
FIG. 21 is a signal flow diagram illustrating an RRC configuration- and DCI-based beam reporting operation method and procedure of a base station/terminal according to an embodiment of the disclosure.

FIG. 20 is a signal flow diagram illustrating a DCI-based beam-reporting operation method and procedure of a base station/terminal according to an embodiment of the disclosure, and FIG. 21 is a signal flow diagram illustrating an RRC configuration- and DCI-based beam reporting operation method and procedure of a base station/terminal according to an embodiment of the disclosure.

FIG. 20 shows a DCI-based beam reporting operation method and procedure, and FIG. 21 shows a DCI-based indication procedure in the state where a configuration on the RRC reporting-related process is made via RRC.

In reference to FIG. 20, the base station (e.g., one or more TRPs) transmits to the terminal a beam selection-related RRC configuration at step S2010 and then a beam reporting indication in the DCI via PDCCH at step S2020. The base station and the terminal perform a beam selection criterion-based beam selection at step S2030, and the terminal performs beam reporting with a selected beam ID, a corresponding RSRP, and a virtual TRP ID (if necessary) at step S2040.

In reference to FIG. 21, the base station (e.g., one or more TRPs) transmits to the terminal an RRC configuration related to beam selection and reporting at step S2110 and a beam reporting indication in DCI via PDCCH at step S2120. The base station and the terminal perform a beam selection criterion-based beam selection at step S2130, and the terminal performs beam reporting with a selected beam ID, a corresponding RSRP, and a virtual TRP ID (if necessary) at step S2040.

If the beam selection criterion is preconfigured to the base station/terminal, the corresponding information is not transmitted via RRC; if a variable criterion is applied, the criterion is configured via RRC. If the beam selection criterion needs changing dynamically, it may be possible to indicate the beam selection criterion via DCI with or without defining a process for the criterion via RRC. The disclosed concepts are not limited to the operations described in the embodiments of FIGS. 20 and 21, and they may be applicable along with all of the above-described schemes, i.e., by modifying the indication signaling, to perform the beam reporting in the same procedure of FIG. 20 or 21.

Hereinafter, beam reporting-related descriptions are made based on Scenario 1 for convenience of explanation.

Examples of DCI-Based Indication or RRC-Based Indication

The values of N and M may be indicated via DCI or RRC signaling as follows. It may be possible to preconfigure a set of available numbers of beam groups as N={1,2,4,8} and indicate one of the numbers of the beam groups via DCI or RRC. In the above example, a 2-bit indication may be used because the available number of groups is 4.

In the case of applying the same value of M to each group, it may be possible to preconfigure a set of available numbers of beams as M={1,2,3,4} and indicate one of the numbers of beams per group via DCI or RRC. In the above example, a 2-bit indication may be used because the available number of beams is 4.

Figure 22:
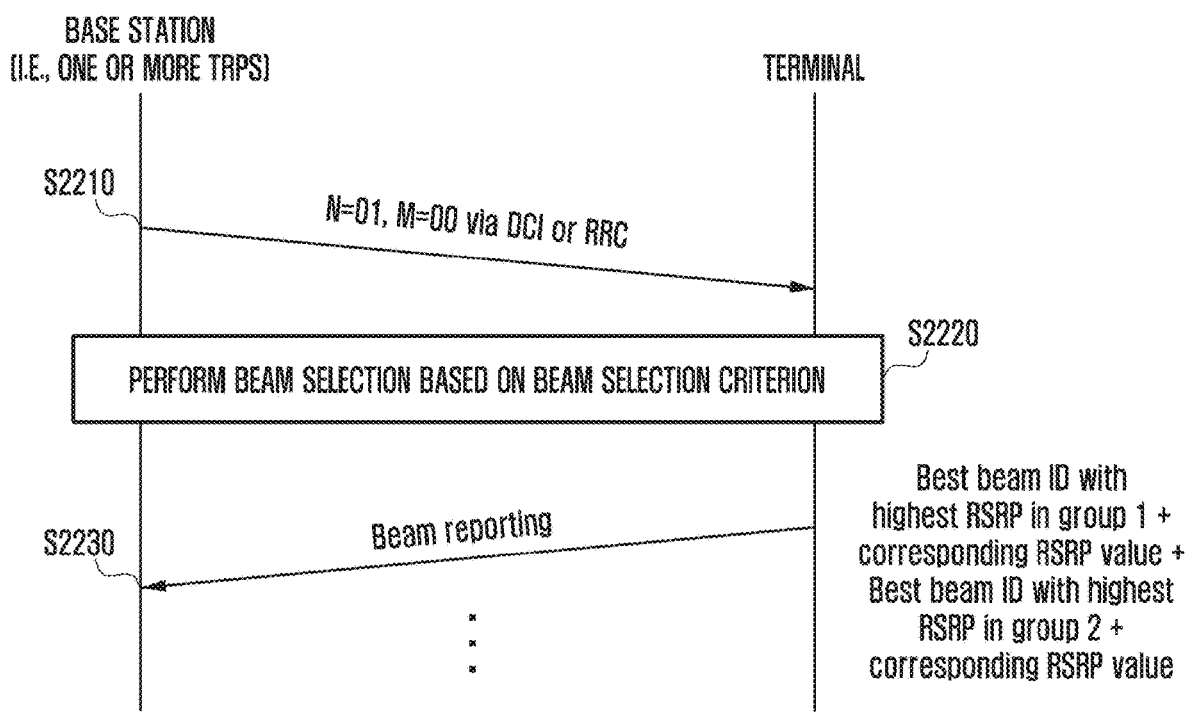
FIG. 22 is a diagram illustrating a method and operation procedure for indicating a number of groups (N) and a number of reporting beams (M) via RRC or DCI according to an embodiment of the disclosure.

FIG. 22 is a diagram illustrating a method and operation procedure for indicating a number of groups (N) and a number of reporting beams (M) via RRC or DCI according to an embodiment of the disclosure.

FIG. 22 shows an exemplary operation procedure for indicating the N and M values. For convenience of explanation, the beam reporting information is limited to beam ID and corresponding RSRP, and it is assumed that the beam selection is made in the highest RSRP-first order. In reference to FIG. 22, the terminal sorts the number of beam groups in a set of all the beams into two groups (first and second groups) and reports the best beam among the beams in each group. The terminal may perform the beam reporting with the best beam ID corresponding to the highest RSRP value in the first group and the best beam ID corresponding to the highest RSRP value in the second group to the base station. In the case where the value of M differs between the groups, it is necessary to secure the value of M equal to the total number of groups N. It may be possible to indicate N M values via DCI or RRC.

Figure 23:
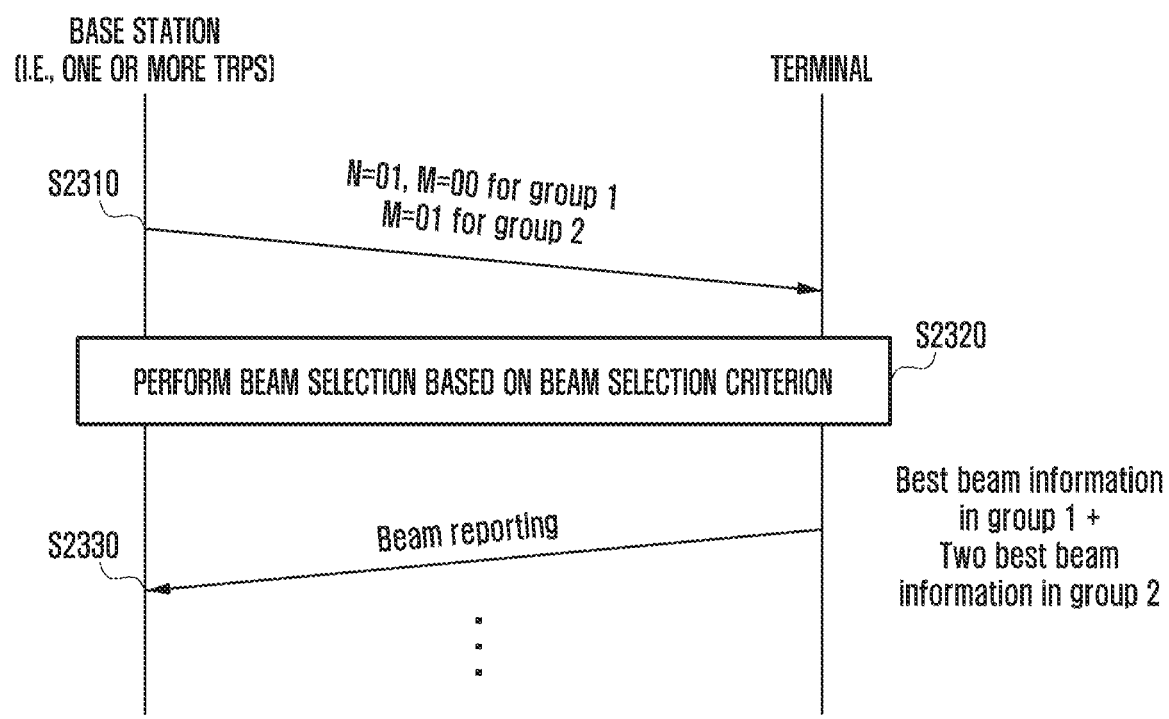
FIG. 23 is a diagram illustrating a method and operation procedure for indicating a number of groups (N) and a number of per-group reporting beams (M) via RRC or DCI according to an embodiment of the disclosure.

FIG. 23 is a diagram illustrating a method and operation procedure for indicating a number of groups (N) and a number of per-group reporting beams (M) via RRC or DCI according to an embodiment of the disclosure.

FIG. 23 shows an exemplary operation procedure for indicating the N and M values. In the embodiment of FIG. 23, beam information means beam related information including a beam ID and RSRP corresponding to the beam ID.

In FIG. 23, a base station (one or more TRPs) is capable of configuring two M values and transmitting information indicating per-group M values in the form of a bitmap. In the case of making an indication in the form of a bitmap, the indication is made with two M values and a bitmap of length N in the corresponding signaling because N is indicated in duplicate. If a set of M values is predetermined, it may be possible to indicate a reporting mode using a bitmap of length N. In reference to FIG. 23, the base station may set the number of groups (N) to 2, the number of reporting beams in the first group (M) to 1, and the number of reporting beams in the second group (M) to 2 for a terminal. Afterward, the terminal may perform beam reporting by transmitting information on one best beam in the first group and two best beams in the second group to the base station.

Figure 24:
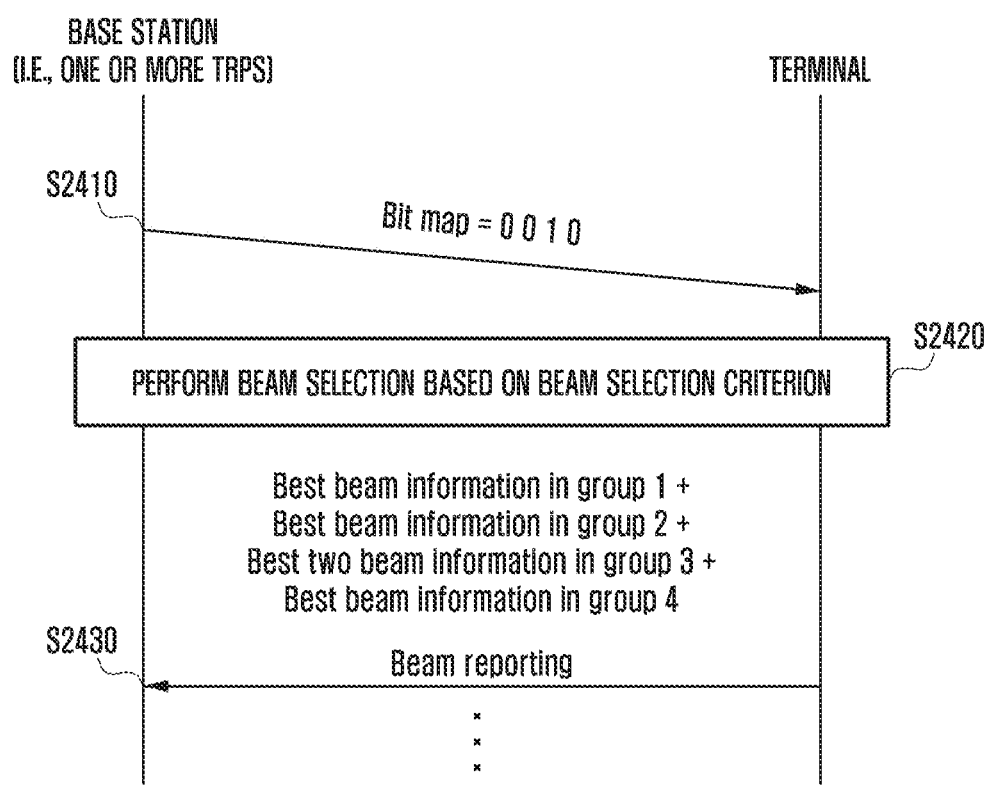
FIG. 24 is a diagram illustrating a method for indicating a reporting mode in the form of a bitmap via RRC or DCI according to an embodiment of the disclosure.

FIG. 24 is a diagram illustrating a method for indicating a reporting mode in the form of a bitmap via RRC or DCI according to an embodiment of the disclosure.

FIG. 24 shows an exemplary procedure for indicating the N and M values. If N=4 and M={1,2}, this means that the configuration is made to report information on one or two beams per group. In reference to FIG. 24, if N=4, the base station may transmit a bitmap of 0010 to configure numbers of reporting beams (M) for the first to fourth groups, respectively, to the terminal. Afterward, the terminal may perform a beam reporting by transmitting information on one best beam in the first group, one best beam in the second group, two best beams in the third group, and one best beam in the fourth group to the base station.

Example of indication via DCI after process configuration for reporting via RRC.

In the embodiments of FIGS. 22 to 24, the information on the sets of N and M values known to the base station/terminal is configured via RRC, and the values of N and M are indicated via DCI based on the corresponding mapping table. In the case where multiple TRPs are installed within a cell, the base station may group the M and N values appropriately based on the information on all the beams and TRP locations in a few predetermined schemes. The beam grouping may be performed by a unit of one or more TRBs in the cell, and the transmission beams of one TRP may belong to one or more beam groups.

Figure 26:
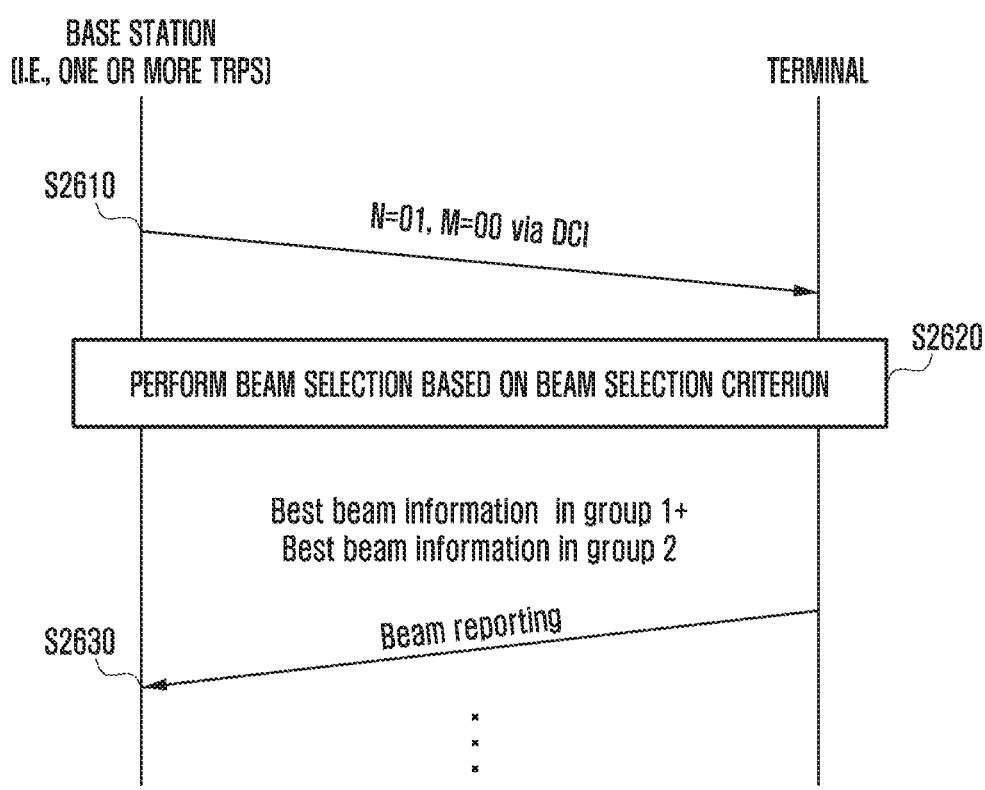
FIG. 26 is a diagram illustrating a method and operation procedure for indicating a number of groups and a number of reporting beams via RRC configuration and DCI indication according to an embodiment of the disclosure.

FIG. 25 is a diagram illustrating an RRC configuration for beam grouping according to an embodiment of the disclosure, and FIG. 26 is a diagram illustrating a method and operation procedure for indicating a number of groups and a number of reporting beams via RRC configuration and DCI indication according to an embodiment of the disclosure.

In the case where a set related to beam grouping is configured via RRC, the following operations may be performed in an embodiment. In the corresponding embodiment, assuming four TRPs located within a cell, if all of the beams are sorted into one group, if beam grouping is performed by a unit of two TRPs, or if two beam groups are used per TRP, it may be possible to transmit to the terminal a configuration table as shown in FIG. 25 and make an indication via DCI as shown in FIG. 26. In this embodiment, it is assumed that each TRP manages 25 beams, among 100 beams available in the cell, or corresponding beam IDs.

In FIG. 26, an M value mapping table corresponds to RRC configuration information, and a signal flow diagram shows a DCI-based indication method and operation procedure in the case where the same value of M is applied to each group. In reference to FIG. 26, the base station may configure the same number of reporting beams (M), e.g., M=1, for respective groups, and the terminal may perform beam reporting by transmitting information on the best beams in the first and second groups to the base station.

Figure 27:
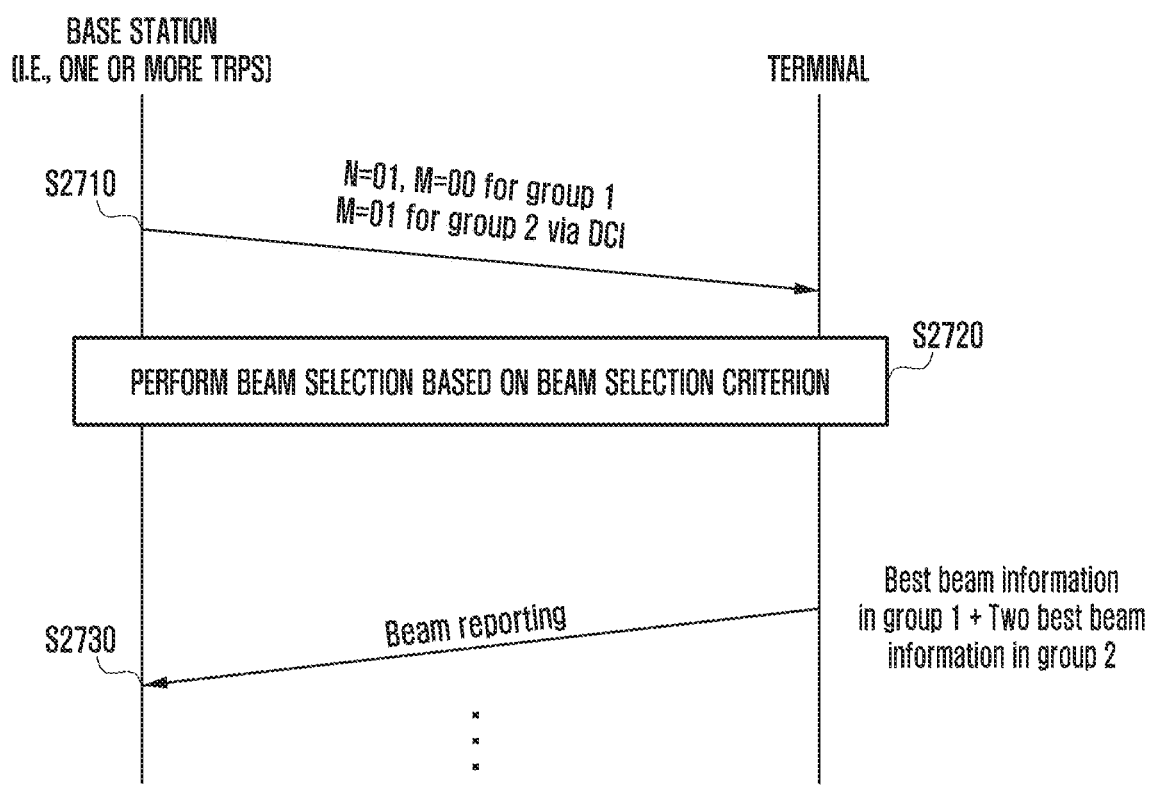
FIG. 27 is a diagram illustrating a method and operation procedure for indicating a number of groups and a number of reporting beams per group via RRC configuration and DCI indication.

FIG. 27 is a diagram illustrating a method and operation procedure for indicating a number of groups and a number of reporting beams per group via RRC configuration and DCI indication.

In FIG. 27, an M value mapping table corresponds to RRC configuration information, and a signal flow diagram shows a method and operation procedure for indicating a number of reporting beams per group. In the embodiments of FIGS. 26 and 27, the operation procedure is performed based on the RRC configuration information related to N groupings as shown in FIG. 25. In reference to FIG. 27, the base station may set the number of groups (N) to 2, the number of reporting beams in the first group (M) to 1, and the number of reporting beams in the second group (M) to 2 for a terminal. Afterward, the terminal may perform beam reporting by transmitting information on one best beam in the first group and two best beams in the second group to the base station.

Figure 28:
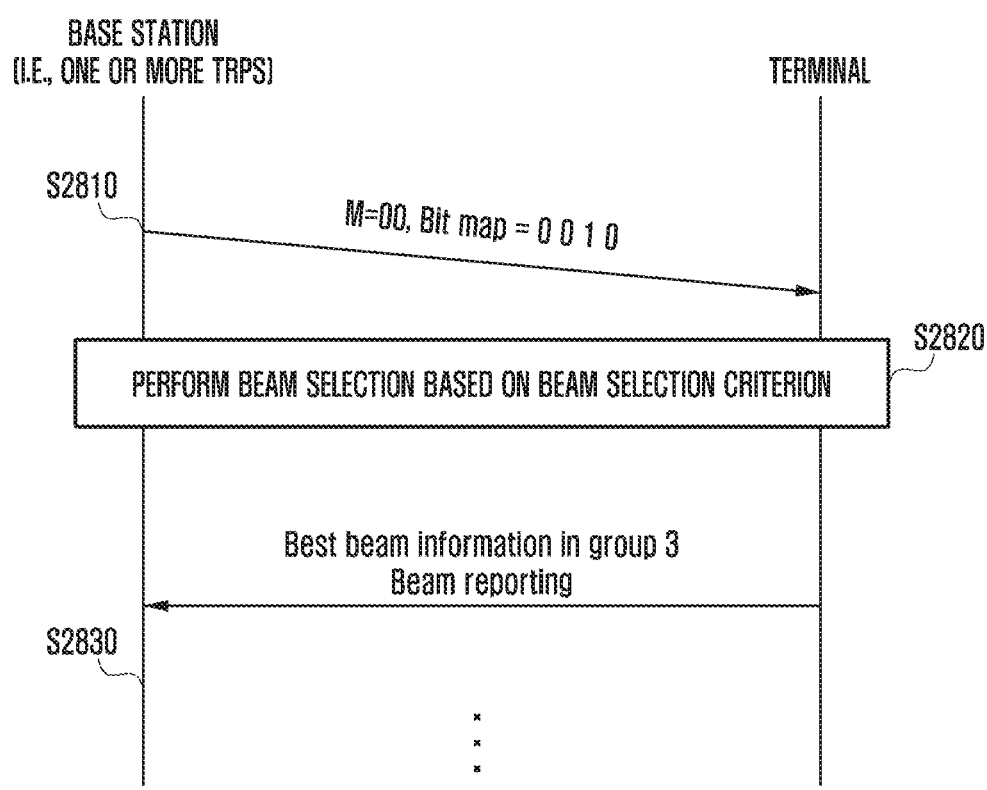
FIG. 28 is a diagram illustrating a method for indicating a reporting mode in the form of a bitmap via RRC configuration and DCI indication.

FIG. 28 is a diagram illustrating a method for indicating a reporting mode in the form of a bitmap via RRC configuration and DCI indication.

FIG. 28 shows an exemplary procedure for configuring a mapping table related to sets of two different levels of M values via RRC and indicating sets of M values and lengths of N values in the form of a bitmap and the total number of groups and a number of beams to be reported per group according to an embodiment of the disclosure. In reference to FIG. 28, the terminal may perform beam reporting by transmitting information on the best beam in the third group according to the indication on a set of M values and a bitmap of length N transmitted by the base station.

[Reporting Mode 2 Operation Method and Procedure]

Mode 2: Selection of M Beams Corresponding to Same Terminal Beam for Transmission A base station may trigger reporting on one or more TRP beams corresponding to the same beam of a terminal in order to communicate data via multiple TRPs within a cell or overcome a blockage phenomenon. Such reporting may be triggered in any of following schemes.

A scheme for a base station to designate a beam of a terminal.

A scheme for a base station to designate a beam of a terminal in association with a specific base station beam.

A scheme for designating a terminal beam in use for current communication.

Figure 29:
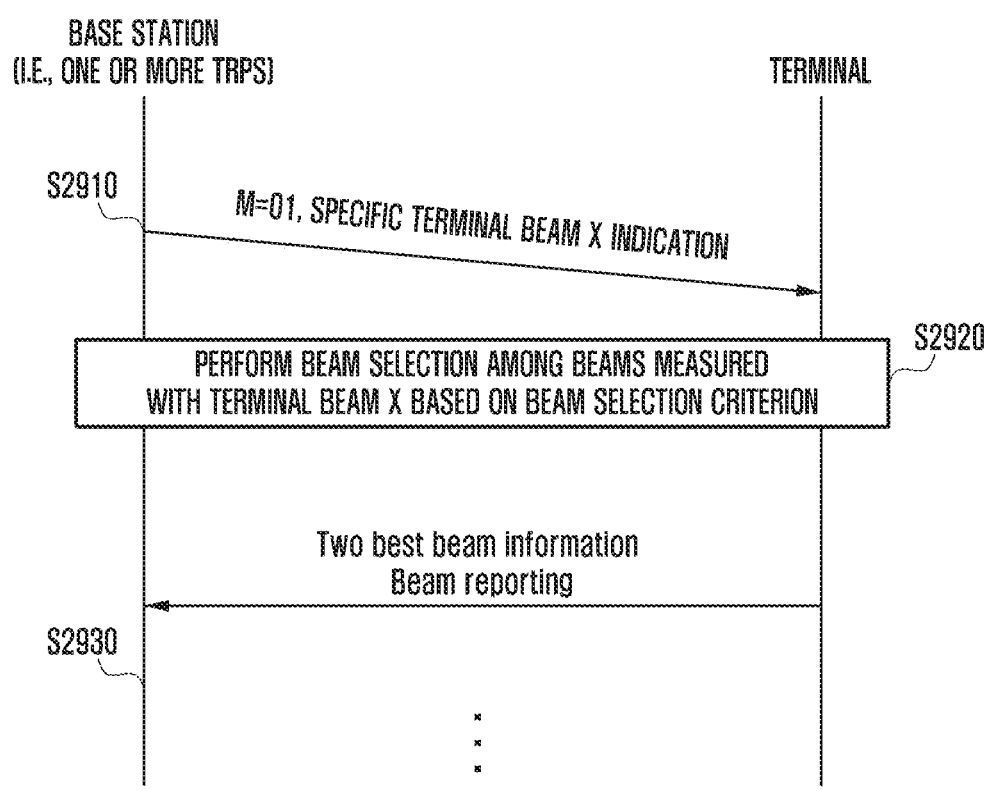
FIG. 29 is a diagram illustrating a method for a base station to explicitly designate a beam of a terminal according to an embodiment of the disclosure.

FIG. 29 is a diagram illustrating a method for a base station to explicitly designate a beam of a terminal according to an embodiment of the disclosure.

FIG. 29 shows a method for the base station to explicitly designate a beam of a terminal according to an embodiment of the disclosure; this method requires the terminal to report on its beam in advance. In reference to FIG. 29, the base station (e.g., one or more TRPs) transmits an indication on a specific terminal beam x to the terminal and, afterward, the base station and the terminal may select a beam among the beams measured with the terminal beam x based on a beam selection criterion. The terminal may perform beam reporting by transmitting information on two best beams to the base station.

Figure 30:
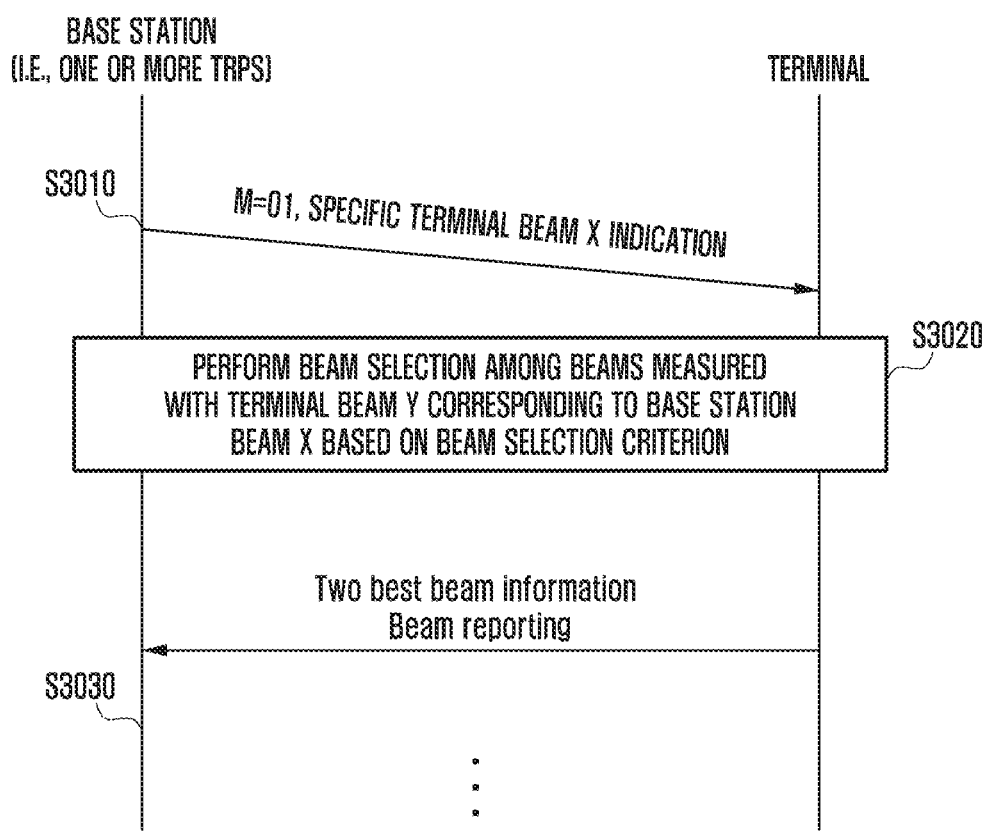
FIG. 30 is a diagram illustrating a method for a base station to designate a beam of a terminal in association with a specific base station beam according to an embodiment of the disclosure.

FIG. 30 is a diagram illustrating a method for a base station to designate a beam of a terminal in association with a specific base station beam according to an embodiment of the disclosure.

FIG. 30 shows a method for the base station to designate a beam of the terminal with a specific base station beam according to an embodiment of the disclosure; this method requires that a base station beam previously reported by the terminal is paired with a terminal beam.

Figure 31:
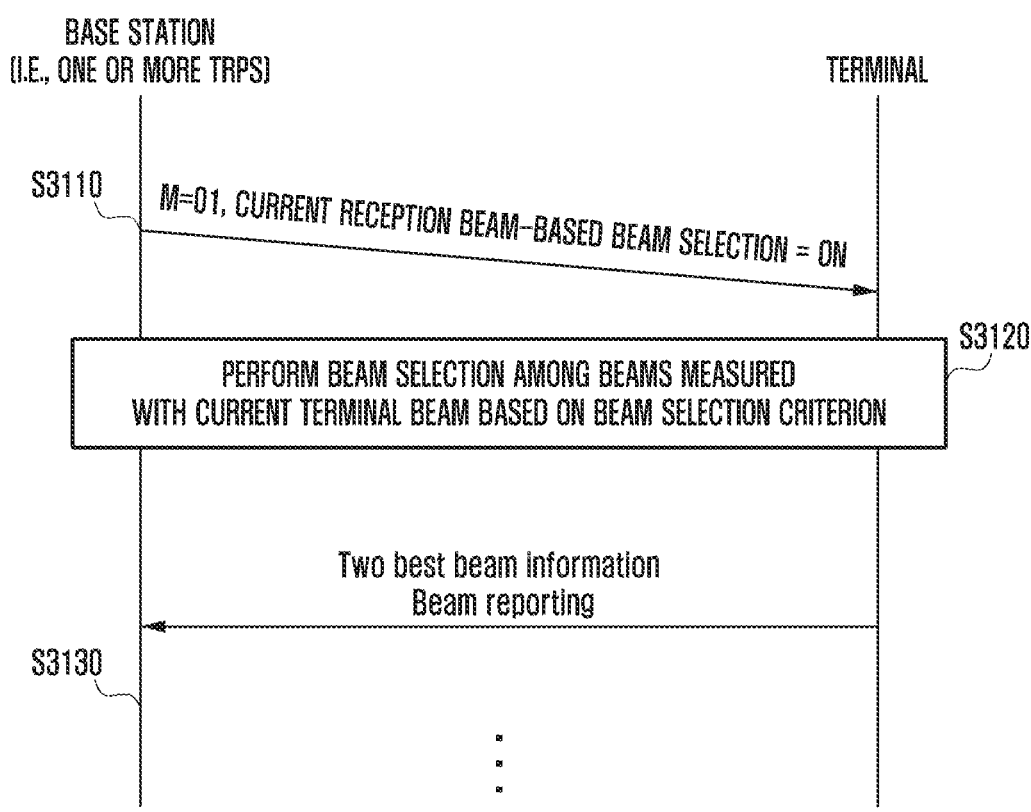
FIG. 31 is a diagram illustrating a method for indicating terminal beam-based reporting according to an embodiment of the disclosure.

FIG. 31 is a diagram illustrating a method for indicating terminal beam-based reporting according to an embodiment of the disclosure.

In the embodiments of FIGS. 29 to 31, it is possible to indicate configuration of M base station beams corresponding to a designated terminal beam; M may be determined among specific M values predefined between the base station and the terminal as in the embodiments of FIGS. 29 and 27 in Reporting mode 1 or configured by the base station via RRC signaling. In FIG. 31, a current terminal reception beam-based on/off mapping table may be configured via higher layer signaling (including RRC signaling).

One of reporting modes 1 and 2 may be indicated implicitly or explicitly in triggering the beam reporting. That is, in the embodiments of FIGS. 29 and 30, reporting mode 2 is enabled for the case where a terminal beam designation indication is present, and reporting mode 1 is enable for the case where no terminal beam designation indication is present.

FIG. 32 is a diagram illustrating reporting mode indication tables according to an embodiment of the disclosure.

In the case of the explicit indication, it may be possible to indicate the reporting mode via DCI triggering a beam reporting as in the embodiment of FIG. 32. That is, it may be possible to indicate one or more reporting modes via reporting indication DCI delivered from the base station to the terminal in association with the tables as shown in FIG. 32. The tables of FIG. 32 may be configured via higher layer signaling (including RRC signaling).

In Scenario 2, because the individual TRPs can operate to perform beam grouping and reporting on all beam sets and can be distinguished from each other based on virtual TRP IDs, one or more virtual IDs may be signaled in triggering or indicating the beam reporting and, if the beam reporting is performed with no given virtual TRP ID, the virtual TRP IDs may be transmitted along with the information on the beams. The disclosure is not limited to specific embodiments including specific base station and terminal operations, and it may include other embodiments extended by aggregating or combining the specific embodiment in whole or in part.

Figure 33:
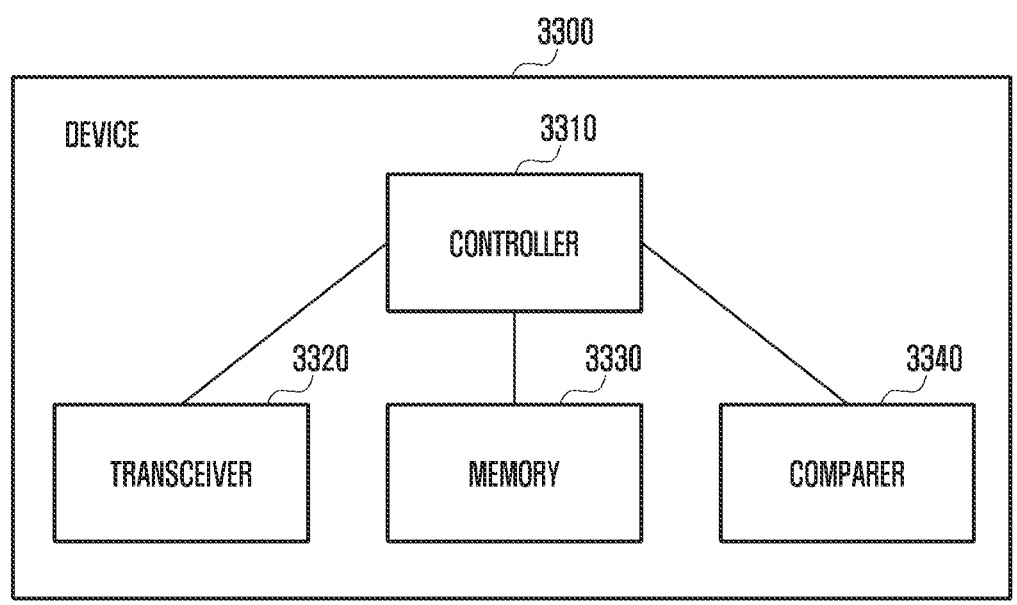
FIG. 33 is a block diagram illustrating a configuration of a terminal according to the second embodiment of the disclosure

FIG. 33 is a block diagram illustrating a configuration of a terminal according to the second embodiment of the disclosure.

In reference to FIG. 33, the terminal 3300 includes a controller 3310, a transceiver 3320, a memory 3330, and a comparer 3340 by way of example. The components constituting the terminal 3300 may be split into more components or integrated into fewer components depending on an embodiment or an operator's intention.

The memory 3330 stores information signaled by a base station or information buffered in decoding. The memory 3330 stores all of the information saved in the terminal 3300 as described in the above embodiments of the disclosure. The transceiver 3320 receives downlink signals from the base station, as described in the above embodiments, by applying a terminal beamforming under the control of the controller and stores corresponding results in the memory 3330. The controller 3310 controls overall operations of the terminal as described in the above embodiments. The comparer performs comparison and checking operations executed by a device as described in the above embodiments. Detailed descriptions of individual operations are omitted herein.

Figure 34:
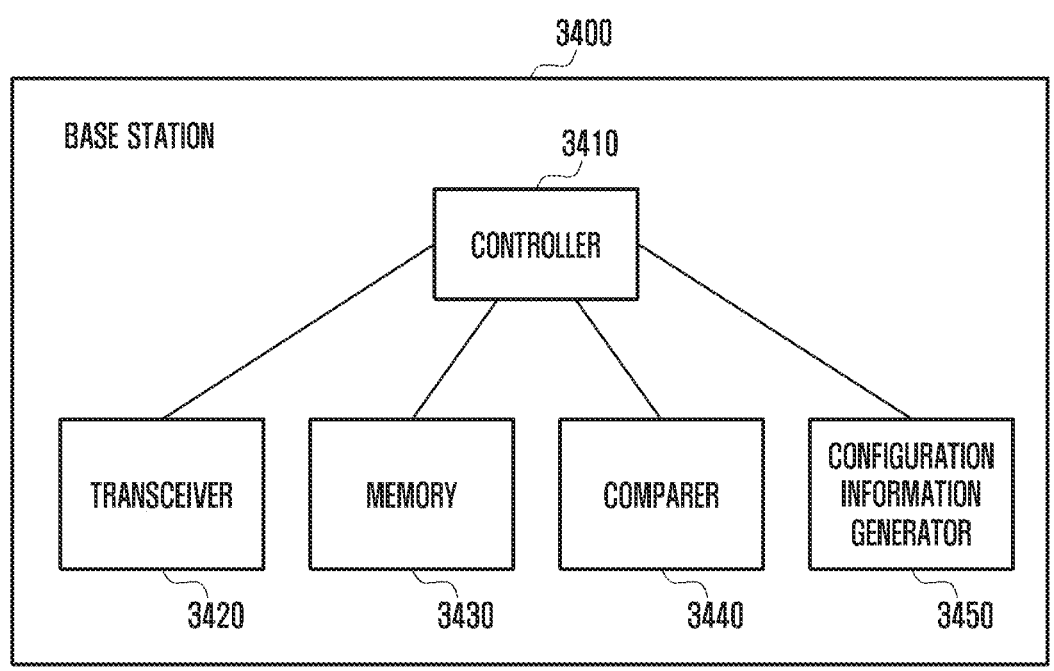
FIG. 34 is block diagram illustrating a configuration of a base station according to the second embodiment of the disclosure.

FIG. 34 is block diagram illustrating a configuration of a base station according to the second embodiment of the disclosure.

As shown in FIG. 34, the base station includes a controller 3410, a transceiver 3420, a memory 3430, a comparer 3440, and a configuration information generator 3450 by way of example. The configuration of the base station 3400 is not limited thereto, and the components may be split into more components or integrated into fewer components.

The comparer 3440 performs comparison and checking operations on the information received from a terminal under the control of the controller 3410. The configuration information generator 3450 generates information to be transmitted to terminals under the control of the controller 3410. The memory 3430 stores configuration information transmitted to the terminals. The memory 3430 stores all of the information saved in the base station as described in the above embodiments of the disclosure. The transceiver 3420 transmits downlink signals as described in the above embodiments. Particularly in this embodiment, the transceiver transmits beamforming-based signals. The controller 3410 controls overall operations of the base station as described in the above embodiments.

Although the descriptions are made of the embodiments of FIGS. 33 and 34 by way of examples, the disclosure may include other embodiments of various configurations of the device and receiver. The embodiments of the disclosure may be implemented independently, or two or more embodiments may be combined in part or in whole.

Third Embodiment

Before undertaking the descriptions of the structure and operation of the disclosure, the following assumptions are made about a system for convenience of explanation. The disclosure is not limited to current systems, and it may be applicable universally.

Signals and channels carrying initial access-related synchronization information and system information are transmitted on analog beams formed by a base station in a beam-sweeping manner. It is assumed that the base station transmits the corresponding signals repeatedly on the respective analog beams and a terminal receives a PSS and SSS on a sweeping reception beam to achieve synchronization and a PBCH to acquire the system information in an initial synchronization procedure.

The disclosure includes an operation method and device for detecting whether a time index indicative of resources on which the PSS and SSS are repetitively transmitted in a beam-sweeping manner before receipt of a PBCH has an error based on the PBCH in an initial synchronization procedure. It is assumed that the same PSS/SSS/PBCH is carried in every SS block on different beams for convenience of explanation. Multiple SS blocks form an SS burst, and multiple bursts form an SS burst set. It is assumed that the same PSS/SSS/PBCH is transmitted in one SS burst set using all the beams managed by the base station. It is assumed that the SS block, burst, and burst set are TDMed.

The disclosure also includes a method and apparatus for configuring resources or channels for use in transmitting SIB information through the PBCH.

[Method and Procedure for Detecting Whether an SS Resources Time Index has an Error]

In LTE, a PBCH is scrambled with a scrambling sequence generated with a cell ID as an initial seed value. That is, if the terminal decodes the PBCH properly, it may be able to confirm the currently detected cell ID. In an mmWave system, synchronization signals (SSs) are repeatedly transmitted on different beams formed through a beam sweeping operation in the initial access procedure. If the terminal detects an SS successfully, it may acquire synchronization with the base station and further acquire an OFDM symbol index or a time index of an SS block. In order to detect whether the time index of the SS block, the seed value of the PBCH scrambling sequence is used as the cell ID and the OFDM symbol index or SS block index value as the seed value.

FIG. 35 is a diagram illustrating equations for configuring a PBCH scrambling sequence seed value according to an embodiment of the disclosure.

In reference to FIG. 35, an initial seed value for generating a scrambling sequence may be derived by selecting some of following parameters and combining the selected parameters.

Cell ID
SS block index
OFDM symbol index
Number of SS blocks within SS burst
Number of bursts within SS burst set The initial seed value may derived by parameters related to the information acquired by the terminal before PBCH transmission in addition to the above parameters.

Figure 36:
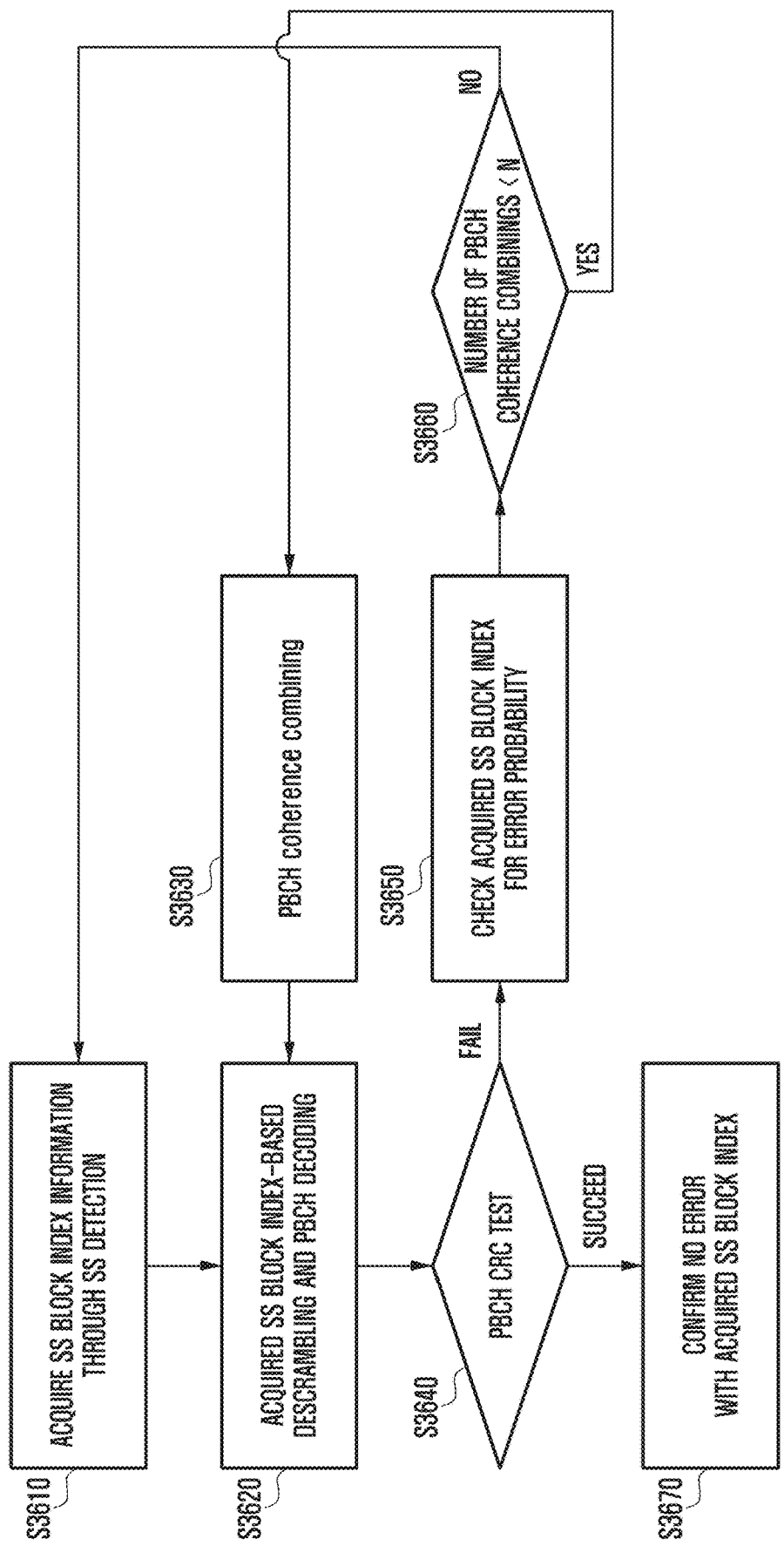
FIG. 36 is a flowchart illustrating a procedure for detecting an error of an SS block time index acquired from an SSS according to an embodiment of the disclosure

FIG. 36 is a flowchart illustrating a procedure for detecting an error of an SS block time index acquired from SSS according to an embodiment of the disclosure.

FIG. 36 shows an operation procedure for a terminal to detect an error of a time index acquired from SSS. At step S3610, the terminal acquires SS block index information through an SS detection process. The acquired SS block index is used as an initial seed value of a scrambling sequence for use in transmitting a PBCH in the corresponding SS block. At step S3620, the terminal attempts to decode the PBCH based on the acquired SS block index.

At step S3640, the terminal performs a CRC test to determine whether the PBCH decoding succeeds. If the PBCH decoding succeeds, the terminal determines at step S3670 that the currently acquired SS block index is correctly detected and performs an operation subsequent to the PBCH decoding. This aims for the terminal to detect an error in the SS block index, even though the PBCH decoding is performed successful, in an operation following the PBCH decoding operation and prevent the procedure from going back to the synchronization operation.

If the PBCH decoding fails, the terminal performs PBCH combining N times based on the SS block index and PBCH transmission periodicity and attempts to decode the PBCH at steps S3650, S3660, and S3630. If decoding has not been successful, the terminal may perform the procedure again from the SS detection step or PBCH decoding step. In this embodiment, the procedure goes to the step of acquiring an SS block index through synchronization signal detection by way of example.

Figure 37:
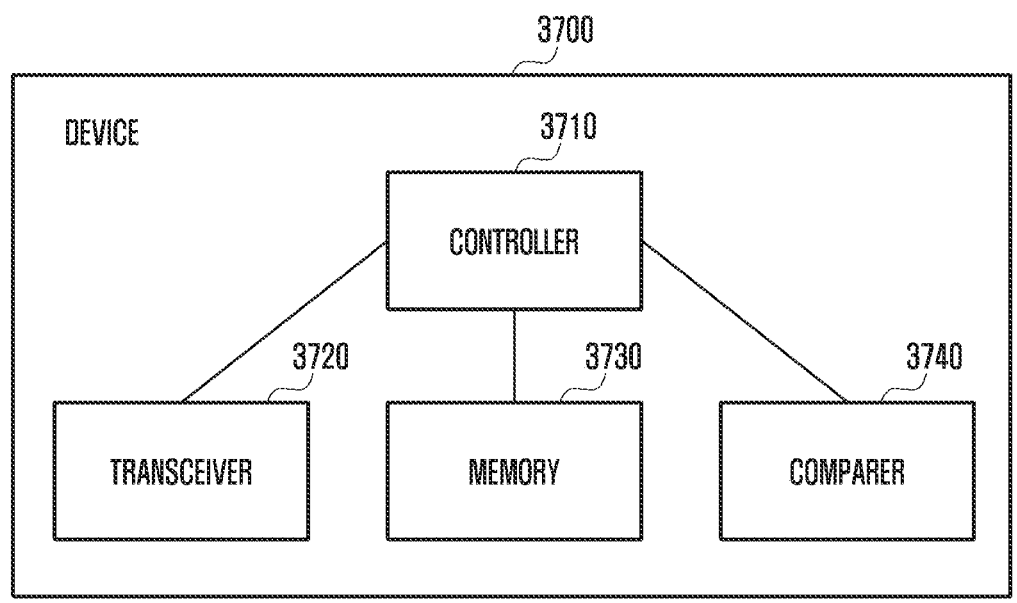
FIG. 37 is block diagram illustrating a configuration of a terminal according to the third embodiment of the disclosure.

FIG. 37 is block diagram illustrating a configuration of a terminal according to the third embodiment of the disclosure.

In reference to FIG. 37, the terminal 3700 includes a controller 3710, a transceiver 3720, a memory 3730, and a comparer 3740 by way of example. The components constituting the terminal 3700 may be split into more components or integrated into fewer components depending on an embodiment or an operator's intention.

The memory 3730 stores information signaled by a base station or information buffered in decoding. The memory 3730 stores all of the information saved in the terminal 3700 as described in the above embodiments of the disclosure. The transceiver 3720 receives downlink signals from the base station, as described in the above embodiments, by applying a terminal beamforming under the control of the controller and stores corresponding results in the memory 3730. The controller 3710 controls overall operations of the terminal as described in the above embodiments. The comparer performs comparison and checking operations executed by a device as described in the above embodiments. Detailed descriptions of individual operations are omitted herein.

Figure 38:
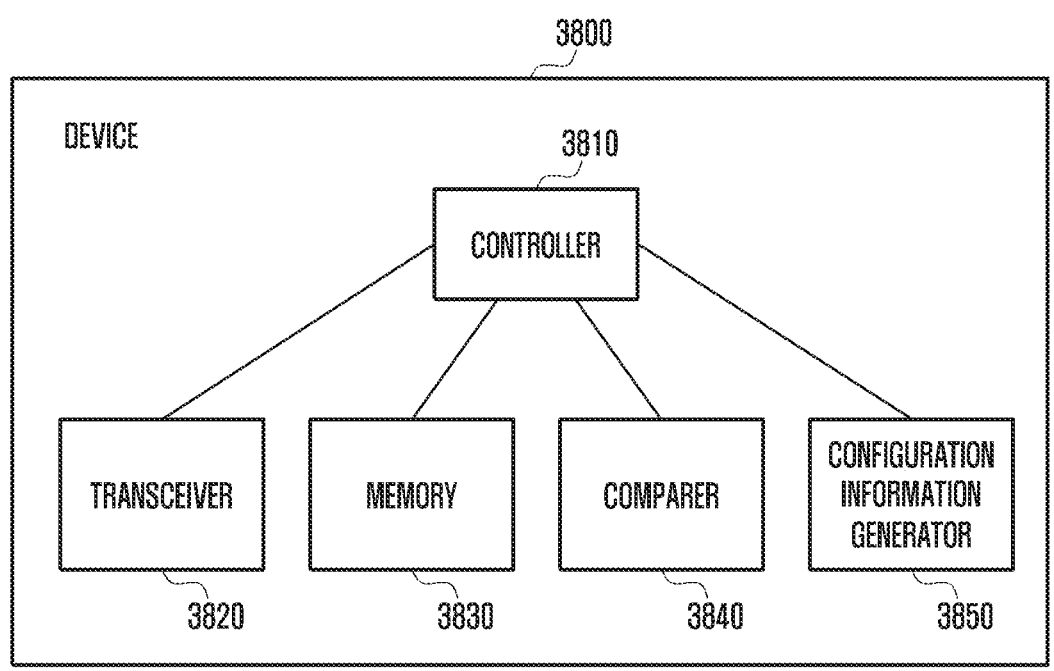
FIG. 38 is block diagram illustrating a configuration of a base station according to the third embodiment of the disclosure.

FIG. 38 is block diagram illustrating a configuration of a base station according to the third embodiment of the disclosure.

As shown in FIG. 38, the base station includes a controller 3810, a transceiver 3820, a memory 3830, a comparer 3840, and a configuration information generator 3850 by way of example. The configuration of the base station 3800 is not limited thereto, and the components may be split into more components or integrated into fewer components.

The comparer 3840 performs comparison and checking operations on the information received from a terminal under the control of the controller 3810. The configuration information generator 3850 generates information to be transmitted to terminals under the control of the controller 3810. The memory 3830 stores configuration information transmitted to the terminals. The memory 3830 stores all of the information saved in the base station as described in the above embodiments of the disclosure. The transceiver 3820 transmits downlink signals as described in the above embodiments. Particularly in this embodiment, the transceiver transmits beamforming-based signals. The controller 3810 controls overall operations of the base station as described in the above embodiments.

Although the descriptions are made of the embodiments of FIGS. 37 and 38 by way of examples, the disclosure may include other embodiments of various configurations of the device and receiver. The embodiments of the disclosure may be implemented independently, or two or more embodiments may be combined in part or in whole.

The invention claimed is:

1. An initial access method of a terminal in a wireless communication system, the method comprising:
    detecting a first synchronization signal and a second synchronization signal;
    acquiring a cell ID based on the first and second synchronization signals; and
    receiving a physical broadcast channel (PBCH) including system information, wherein the PBCH is scrambled based on a scrambling sequence being initiated for a synchronization signal (SS) block including the first synchronization signal, the second synchronization signal and the PBCH; and
    acquiring the system information based on the cell ID and the initiated scrambling sequence.

2. The method of claim 1,
    wherein the initiated scrambling sequence is related to an index of the SS block, and
    wherein the index of the SS block is distinguished with the initiated scrambling sequence.

3. The method of claim 2, the acquiring system information comprising:
    descrambling on the PBCH using the cell ID and part of the index of the SS block;
    decoding the PBCH based on a result of the descrambling; and acquiring the system information according to a result of the decoding.

4. The method of claim 2, wherein the SS block uses a beam different from that in use by another SS block.

5. An initial access control method of a base station in a wireless communication system, the method comprising:
   transmitting a first synchronization signal and a second synchronization signal to a terminal;
   generating a physical broadcast channel (PBCH) including system information by scrambling based on a scrambling sequence being initiated for a synchronization signal (SS) block including the first synchronization signal, the second synchronization signal and the PBCH; and
   transmitting to the terminal the PBCH,
   wherein the system information is acquired, by the terminal, based on the cell ID and the initiated scrambling sequence.

6. The method of claim 5,
   wherein the initiated scrambling sequence is related to an index of the SS block, and
   wherein the index of the SS block is distinguished with the initiated scrambling sequence.

7. The method of claim 5, wherein the PBCH is scrambled with the cell ID related to the first and second synchronization signals and the index of the SS block.

8. The method of claim 5, wherein the SS block uses a beam different from that in use by another SS block.

9. A terminal performing an initial access in a wireless communication system, the terminal comprising:
   a transceiver configured to transmit and receive signals; and
   a controller connected to the transceiver and configured to control to:
   detect a first synchronization signal and a second synchronization signal, acquire a cell ID based on the first and second synchronization signals,
   receive a physical broadcast channel (PBCH) including system information, wherein the PBCH is scrambled based on a scrambling sequence being initiated for a synchronization signal (SS) block including the first synchronization signal, the second synchronization signal and the PBCH, and
   acquire the system information based on the cell ID and the initiated scrambling sequence.

10. The terminal of claim 9,
    wherein the initiated scrambling sequence is related to an index of the SS block, and
    wherein the index of the SS block is distinguished with the initiated scrambling sequence.

11. The terminal of claim 9, wherein the controller is further configured to control to:
    descramble on the PBCH using the cell ID and the index of the SS block,
    decode the PBCH based on a result of the descrambling, and
    acquire the system information according to a result of the decoding.

12. The terminal of claim 9, wherein the SS block uses a beam different from that in use by another SS block.

13. A base station controlling an initial access in a wireless communication system, the base station comprising:
    a transceiver configured to transmit and receive signals; and
    a controller connected to the transceiver and configured to control to:
    transmit a first synchronization signal and a second synchronization signal to a terminal,
    generate a physical broadcast channel (PBCH) including system information by scrambling based on a scrambling sequence being initiated for a synchronization signal (SS) block including the first synchronization signal, the second synchronization signal and the PBCH, and
    transmit to the terminal the PBCH,
    wherein the system information is acquired, by the terminal, based on the cell ID and the initiated scrambling sequence.

14. The base station of claim 13,
    wherein the initiated scrambling sequence is related to an index of the SS block, and
    wherein the index of the SS block is distinguished with the initiated scrambling sequence.

15. The base station of claim 13, wherein the controller is further configured to control to scramble the PBCH with the cell ID related to the first and second synchronization signals and the index of the SS block.

* * * * *